US009637416B2

(12) United States Patent
Keller et al.

(10) Patent No.: US 9,637,416 B2
(45) Date of Patent: May 2, 2017

(54) REFRACTORY METAL BORIDE CERAMICS AND METHODS OF MAKING THEREOF

(71) Applicant: The United States of America, as represented by the Secretary of the Navy, Washington, DC (US)

(72) Inventors: Teddy M. Keller, Fairfax Station, VA (US); Andrew P. Saab, Washington, DC (US); Matthew Laskoski, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/266,194

(22) Filed: Sep. 15, 2016

(65) Prior Publication Data
US 2017/0001914 A1 Jan. 5, 2017

Related U.S. Application Data

(60) Division of application No. 14/483,195, filed on Sep. 11, 2014, now Pat. No. 9,469,572, which is a division of application No. 13/768,219, filed on Feb. 15, 2013, now Pat. No. 8,865,301, which is a continuation-in-part of application No. 13/749,794, filed on Jan. 25, 2013, now Pat. No. 8,822,023.

(60) Provisional application No. 61/693,930, filed on Aug. 28, 2012, provisional application No. 61/669,201, filed on Jul. 9, 2012, provisional application No. 61/640,744, filed on May 1, 2012, provisional application No. 61/590,852, filed on Jan. 26, 2012.

(51) Int. Cl.
*B82Y 30/00* (2011.01)
*C04B 35/58* (2006.01)
*C04B 35/52* (2006.01)
*C04B 35/524* (2006.01)
*C04B 35/65* (2006.01)
*C04B 35/76* (2006.01)
*C04B 35/83* (2006.01)
*C04B 35/80* (2006.01)

(52) U.S. Cl.
CPC ........ *C04B 35/58078* (2013.01); *B82Y 30/00* (2013.01); *C04B 35/52* (2013.01); *C04B 35/522* (2013.01); *C04B 35/524* (2013.01); *C04B 35/58064* (2013.01); *C04B 35/58071* (2013.01); *C04B 35/65* (2013.01); *C04B 35/76* (2013.01); *C04B 35/80* (2013.01); *C04B 35/83* (2013.01); *C04B 2235/3813* (2013.01); *C04B 2235/3839* (2013.01); *C04B 2235/3843* (2013.01); *C04B 2235/3847* (2013.01); *C04B 2235/3886* (2013.01); *C04B 2235/404* (2013.01); *C04B 2235/421* (2013.01); *C04B 2235/422* (2013.01); *C04B 2235/526* (2013.01); *C04B 2235/5216* (2013.01); *C04B 2235/5248* (2013.01); *C04B 2235/5288* (2013.01); *C04B 2235/656* (2013.01); *C04B 2235/6562* (2013.01); *C04B 2235/6567* (2013.01); *C04B 2235/77* (2013.01); *C04B 2235/781* (2013.01); *C04B 2235/95* (2013.01)

(58) Field of Classification Search
None
See application file for complete search history.

(56) References Cited

U.S. PATENT DOCUMENTS

| 2,735,155 | A | * | 2/1956 | Glaser | C04B 35/58064 264/140 |
| 3,657,592 | A | * | 4/1972 | Kellar | C04B 35/63476 156/155 |
| 4,486,544 | A | * | 12/1984 | De Pous | B22F 3/1003 264/658 |
| 4,512,946 | A | * | 4/1985 | Brun | C04B 35/117 264/332 |
| 4,537,323 | A | * | 8/1985 | Ditchek | B22F 3/1003 220/2.1 R |
| 4,751,048 | A | * | 6/1988 | Christodoulou | B22F 3/23 420/129 |
| 5,010,804 | A | * | 4/1991 | Lee | F41F 1/00 89/7 |
| 5,310,476 | A | * | 5/1994 | Sekhar | C04B 41/5025 204/294 |
| 6,190,634 | B1 | * | 2/2001 | Lieber | B82Y 30/00 423/414 |
| 7,273,509 | B1 | * | 9/2007 | Keller | B22F 9/24 75/362 |

(Continued)

*Primary Examiner* — George Wyszomierski
(74) *Attorney, Agent, or Firm* — US Naval Research Laboratory; Joseph T. Grunkemeyer

(57) ABSTRACT

A composition having nanoparticles of a refractory-metal boride and a carbonaceous matrix. The composition is not in the form of a powder. A composition comprising a metal component, boron, and an organic component. The metal component is nanoparticles or particles of a refractory metal or a refractory-metal compound capable of decomposing into refractory metal nanoparticles. The organic component is an organic compound having a char yield of at least 60% by weight or a thermoset made from the organic compound. A method of combining particles of a refractory metal or a refractory-metal compound capable of reacting or decomposing into refractory-metal nanoparticles, boron, and an organic compound having a char yield of at least 60% by weight to form a precursor mixture. A composition having nanoparticles of a refractory-metal boride that is not in the form of a powder.

12 Claims, 17 Drawing Sheets

(56) References Cited

U.S. PATENT DOCUMENTS

| | | | | |
|---|---|---|---|---|
| 8,128,861 B1 * | 3/2012 | Aghajanian | ........... | C04B 35/563 |
| | | | | 264/682 |
| 8,865,301 B2 * | 10/2014 | Keller | ................... | C04B 35/522 |
| | | | | 423/297 |
| 9,045,374 B2 * | 6/2015 | Keller | ..................... | C01B 31/36 |
| 2004/0025632 A1 * | 2/2004 | Boily | .................... | B82Y 30/00 |
| | | | | 75/307 |
| 2008/0311301 A1 * | 12/2008 | Diss | ..................... | C04B 41/009 |
| | | | | 427/314 |

* cited by examiner

REFRACTORY METAL BORIDE CERAMICS AND METHODS OF MAKING THEREOF

This application is a divisional application of U.S. Pat. No. 9,469,572 issued on Oct. 18, 2016, which is a divisional application of U.S. Pat. No. 8,865,301, issued on Oct. 21, 2014, which claims the benefit of U.S. Provisional Application No. 61/590,852, filed on Jan. 26, 2012, U.S. Provisional Application No. 61/640,744, filed on May 1, 2012, U.S. Provisional Application No. 61/669,201, filed on Jul. 9, 2012, and U.S. Provisional Application No. 61/693,930, filed on Aug. 28, 2012. This application is a continuation in part application of U.S. Pat. No. 8,822,023, issued on Sep. 2, 2014. These applications and all other publications and patent documents referred to throughout this nonprovisional application are incorporated herein by reference.

TECHNICAL FIELD

The present disclosure is generally related to synthesis of refractory-metal borides, such as titanium boride and zirconium boride.

DESCRIPTION OF RELATED ART

Refractory transition metal borides (MB) have some of the highest known melting points (2600-3900° C.) and also outstanding hardness, chemical inertness, thermal conductivity, wear resistance, electrocatalytic activity, and neutron absorption ability. Films, fibers, and powders of these ceramics have been made from polymeric precursors, but large monolithic shapes elude the polymeric method. Refractory MBs are typically prepared by powder metallurgy methods such as hot press sintering at temperatures over 2000° C. Ordinarily, metal boride ceramics made by this technique, which is both energy and time intensive, result in brittle materials, owing partly to the large granular structure and the inconsistency in the MB particle sizes.

Since the late 1960s, there has been an interest in high temperature ceramic materials for such applications as grinding/machining, ball bearings, armors, fibers, brake linings, and turbine blades but structural applications have been lacking due to their brittleness and weakness in shear and tension. More recently, there has been a resurgence of interest in ultra-high temperature materials for hypersonic vehicles (Mach 5-20) with new propulsion and structural concepts. These vehicles include ballistic missiles, hypersonic cruise missiles, re-entry vehicles, space access vehicles, interceptor missiles, and hypersonic cruise aircraft, which can be easily divided into single-use expendable and reusable systems. These expendable and reusable space vehicles, next generation rocket engines, and hypersonic spacecraft need tough materials and structural components capable of operating at temperatures in excess of 2200° C. and must meet several requirements simultaneously, such as high melting temperature, high strength, environmental resistance (oxidative resistance), and thermal conductivity. A hypersonic commercial aircraft would be able to travel from New York to Los Angeles in less than an hour. Thus, current increasing interest in hypersonic vehicles and weapons points to the need for new ultra-high temperature materials for wing leading edges and nose tips along with propulsion system components.

For these applications, progress will come when materials are developed that can be easily processed into shaped components with the required thermomechanical and thermochemical characteristics and properties and that can perform without some form of cooling at temperatures exceeding 2200° C. Such materials do not currently exist. The refractory interstitial transition metal borides are extremely hard, inert, and refractory materials. Unfortunately, they are also brittle and difficult to machine.

At present, attempts to form metal boride ceramics from metal compounds and boron sources such as boron oxide and boron carbide and metal compounds (oxides and halides) have resulted in either powders or poorly formed films. When such a mixture is heated, the result is a mixture of "hot atoms" of metal and boron with elimination of hydrogen halides and the formation of the metal borides as a powder in a classic nucleation-and-growth scheme. The solvothermal reaction in benzene relies on the reaction between refractory metal compounds (metal halides) and boron sources such as boron trichloride in the presence of metallic sodium yielding sodium chloride as a by-product. The current processes produce powdered metal borides and are extremely difficult to control, and are inherently highly inhomogeneous yielding large micron sized particles attributed to the fast reaction kinetics. Another method involved the reaction of metal oxides and boron carbide at extreme high temperature producing powdered metal boride and carbon monoxide.

There is current interest in metal borides with small particle size and high surface area such as titanium boride, zirconium boride, and hafnium boride due to their potential application as in ballistic armor, electronic and thermal conductivity materials, advanced hypersonic engines, airframe leading edges on sharp-bodied reentry vehicles, and nuclear reactors. There is currently interest in refractory metal borides for leading edge and nose cap applications, which require moderately high temperatures. The refractory metal borides have been combined with other ceramics such as silicon carbide to improve the oxidation resistance of these materials in the ultra high temperature region. Many of these metal borides also have metallic like conductivity and/or unusual magnetic properties. Traditionally these materials have been prepared by high temperature powder techniques that are limited in their ability to generate homogeneous materials with controlled compositions and macroscopic properties.

BRIEF SUMMARY

Disclosed herein is a composition comprising nanoparticles of a refractory-metal boride and a carbonaceous matrix. The composition is not in the form of a powder.

Also disclosed herein is a composition comprising a metal component, boron, and an organic component. The metal component is selected from nanoparticles or particles of a refractory metal and a refractory-metal compound capable of decomposing into refractory-metal nanoparticles. The organic component is selected from an organic compound having a char yield of at least 60% by weight and a thermoset made from the organic compound.

Also disclosed herein is a method comprising combining particles of a refractory metal or a refractory-metal compound capable of reacting or decomposing into refractory-metal nanoparticles, boron, and an organic compound having a char yield of at least 60% by weight to form a precursor mixture.

Also disclosed herein is a method comprising: providing a precursor mixture of particles of a refractory metal or a refractory-metal compound capable of decomposing into refractory-metal nanoparticles, boron, and an organic compound; heating the precursor mixture in an inert atmosphere at elevated pressure and at a temperature that causes decomposition of the refractory-metal compound to form refractory-metal nanoparticles to form a metal nanoparticle composition; and heating the metal nanoparticle composition in an inert atmosphere, argon, or nitrogen at a temperature that causes formation of a ceramic comprising nanoparticles of a refractory-metal boride in a carbonaceous matrix. The organic compound has a char yield of at least 60% by weight when heated at the elevated pressure.

Also disclosed herein is a composition comprising nanoparticles of a refractory-metal boride. The composition is not in the form of a powder.

Also disclosed herein is composition comprising the above metal component and boron.

Also disclosed herein is a method comprising: combining particles of a refractory metal or a refractory-metal compound capable of decomposing or reacting into refractory-metal nanoparticles with boron to form a precursor mixture; and heating the precursor mixture in an inert atmosphere or vacuum at a temperature that causes formation of nanoparticles comprising a boride of the refractory metal.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
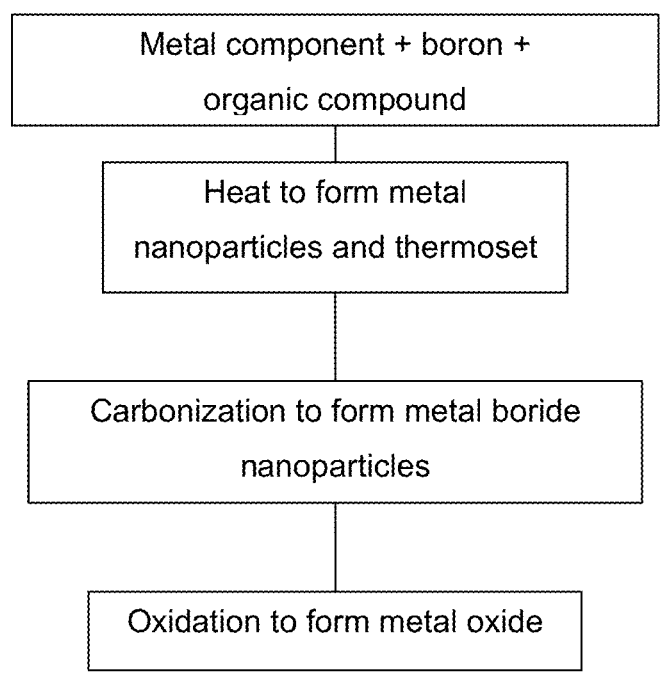
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail. Any numerical range disclosed herein includes every number within the range as well as those within rounding error of the end point of the range.

Disclosed herein is (1) a method for the in situ formation of refractory metal diboride (MB) (Groups IV-VI) ceramics with or without a carbon matrix in one step affording a shaped composition with structural integrity, (2) various refractory metal nanoparticle-boron-carbon precursor compositions, (3) their conversion to shaped thermosets, (4) metal boride and metal boride-metal carbide carbon matrix compositions at multiple stages, (5) the nanoparticle metal boride and nanoparticle metal boride-nanoparticle metal carbide carbon matrix compositions, and (6) fiber reinforced nanoparticle metal boride-nanoparticle metal carbide carbon matrix composites.

The synthetic method disclosed herein may result in the formation of nanoparticle metal borides. To form tough, shaped refractory metal boride solid components/composites, the composition may be consolidated under pressure to remove air pockets and force the reactants into intimate contact at least to the thermoset stage. By its very nature, the invention permits the metal boride-metal carbide carbon composites to be easily shaped by liquid molding procedures (injection molding, infusion molding, vacuum molding, spreading, etc), which is a far less costly and involved process than machining a hot press sintered material.

In the absence of a carbon precursor, metal borides/nitrides may be formed. The materials, methods, and conditions are the same as disclosed elsewhere herein except for the absence of the carbon compound. A metal and boron precursor composition may be shaped to a form under high pressure and then heated to temperatures necessary as a stand alone (removal from mold) or in the mold to form the metal boride and metal nitride. Metal borides would be formed by heating such a composition under argon or helium atmosphere whereas metal boride-metal nitride would form by heating in a nitrogen atmosphere with the metal nitride being formed mainly on the exterior part of a solid component. The method described above does not yield a thermoset since the carbon precursor is not present.

The methods may produce refractory metal (Ti, W, Nb, Zr, Mo, Cr, V, Ta, and Hf) borides in shaped solid configurations from metal nanoparticles. Mixed phases using multiple metals can also be produced. The ceramics are produced as nanoparticles. When a) any metal compound capable of forming stable borides or carbides, and which decomposes into highly reactive metal nanoparticles is combined with b) elemental boron, and (c) carbon precursors that melt and only contain carbon and hydrogen, the combination may be thermally converted to (d) a solid shape containing high yields of both pure metal borides and metal carbides, and possibly some amount of a pure carbon phase. The quantity of the metal boride and metal carbide formed depends on the amount of elemental boron and carbon precursor present in the precursor composition (metal nanoparticles, boron, and carbon precursor). The appropriate metal nanoparticles are formed in situ from the thermal decompositions of metal compounds (including but not limited to carbonyls and hydrides) within the precursor composition. The carbon sources may be melt processable aromatic-containing acetylenes or low molecular weight polymers that exhibit extremely high char yields. The carbon precursor may contain only C and H to insure that heteroatoms (such as nitrogen) are not incorporated into the interstitial sites of the metal nanoparticles during the reaction to produce the metal boride and metal carbide carbon matrix composition. The metal boride and metal carbide may form between 500-1600° C. under inert conditions from reaction of the highly reactive metal nanoparticles with elemental boron and the carbon precursor (degradation above 400° C.) with the reaction occurring much faster at the higher temperatures. The temperatures at which the synthetic process occurs may be well below those normally associated with the formation of boride and carbide ceramics. The carbon precursor is used or is present to glue or bond the individual formed ceramic nanoparticles together as they form within the resulting nanostructured or amorphous elastic carbon. The formed carbon behaves as a matrix to afford structural integrity and to ensure a shaped composition for the developing high surface area ceramic nanoparticles. Pressure may be applied to the composition during the heat treatment and conversion to the shaped thermoset to ensure intimate contact of the reactants and to remove any voids or air pockets ensuring a high density ceramic that does not contain defects.

In the methods disclosed herein (FIG. 1), metal compounds are combined with elemental boron and a carbon precursor that melts. The carbon precursors are compounds such as polymers or resins with functional unsaturation to interact with the metal nanoparticles that form from the metal compounds. The unsaturations also permit the carbon precursor to undergo conversion from the melt to form thermosets or crosslinked polymers. A typical precursor composition includes the boron, the carbon precursor, and the metal compound or multiple metal compounds. Upon heating this composition, the carbon precursor melts at its melting point and may be thermally converted to a shaped solid thermoset 20 through reaction of the unsaturated sites. The carbon precursor can also be partially cured to a B-stage to increase the viscosity but still meltable to enhance the processability and retention of homogeneity within the precursor composition. It is possible that during this step or a subsequent step the metal compound thermally decomposes into metal nanoparticles 10 or the metal powder reacts with the organic component to form nanoparticles which are embedded in the solid thermoset (FIG. 2). Alternatively, the formation of the metal nanoparticles may occur later during the next step in the process, which is the extended heat treatment at higher temperatures. Thermal treatment of the thermoset above 500° C. results in carbonization of the carbon precursor 30 and also reaction 40 between the metal nanoparticles 50 and both the boron source and the now carbonized carbon precursor to form the nanoparticles 60 of the metal boride ceramic (major component) and the metal carbide ceramic (minor component) (FIGS. 3-4). By using a large ratio of boron to carbon precursor, the resulting solid shaped ceramic can be tailored to contain mainly the metal boride. It is also possible for the formation of the reactive metal nanoparticles to occur during the thermal treatment step, instead of the earlier thermosetting step. In addition, if a sufficiently high proportion of carbon precursor is used, an excess of pure solid carbon will remain as a matrix in which the boride and carbide ceramics are embedded. The reaction can also be conducted without the thermoset-forming carbon precursor, using only the refractory metal compound and boron to yield the metal boride alone. Thus, the amount of metal boride, metal carbide, and carbon within the resulting composition can be varied based on the quantity of each individual component (metal compound, boron, and melt processable carbon compound) mixed for usage in the precursor composition. The reaction is performed in a non-reactive inert gas such as argon or helium or vacuum.

When the same reaction is performed in a flow of nitrogen or when the organic compound contains nitrogen, metal nitride nanoparticles may also be formed. Depending on the shape and thickness of the composition, metal boride and both metal nitride and metal carbide may form with the metal carbide and metal boride mainly on the interior part of composition where the nitrogen cannot be in intimate contact.

Reaction of metal salts and decomposition to metal nanoparticles may occur at lower temperatures with reaction to the ceramics occurring by 1200° C. but higher temperatures may be needed at least to 1600° C. for metal powders of micron size. Smaller size particles may react faster and be totally consumed at lower temperatures relative to the larger particle size powders. The particle size of the metal boride/carbide/nitride can be controlled as a function of the upper temperature treatment with higher exposure temperatures affording larger particle size ceramics.

Regardless of the overall ratio of metal compound and elemental boron to the carbon source, the refractory metal boride and metal carbide may form as nanoparticles. This is a highly desirable result, as it is generally accepted that homogeneous nanoparticle composites of ceramics will have better properties than their much more common microparticle counterparts. Currently, the ceramics are fabricated from micron size powdered particles by sintering techniques at extremely high temperatures. An excess of carbon atoms can be made available for reaction with the metal content and to ensure the formation of a carbon matrix in which the refractory metal borides and carbides are bound, or the reaction can be conducted stoichiometrically to yield only the metal boride and metal carbide possibly with a trace of carbon matrix. The amount of metal boride, metal carbide, and carbon within the resulting composition can be varied based on the quantity of each individual component (metal compound, boron, and melt processable carbon compound) mixed for usage in the precursor composition. When the reaction is performed in a nitrogen atmosphere, the metal nanoparticle may preferentially react with the nitrogen relative to the boron and carbon affording the corresponding metal nitrides.

Carbon, ceramic, and metal fibers may be incorporated into various mixtures of precursor compositions composed of boron, metal compounds of Groups IV-VI, and the acetylene-containing aromatic compounds or polymers (carbon source) and the resulting fiber-containing mixture is converted to a shaped solid followed by heating to higher temperatures. Following the same heat treatment steps as defined above results in a composition of some proportion of metal boride, metal carbide, carbon, and fibers, which are intended to serve as a reinforcement component. The precursor composition (metal salt, boron, and carbon precursor) described above are mixed with continuous fibers or chopped fibers and heated until conversion to the shaped thermoset forms. Further heating above 500° C. in an inert atmosphere (argon) results in the formation of the fiber reinforced refractory metal boride-metal carbide-carbon matrix composites. Depending on the ceramic being formed, the tough, solid shaped composite can be used for structural applications in excess of 3000° C. The composite may be exposed to an upper temperature for which it is going to be used so that the physical properties may remain intact and not change. The precursor composition can contain a combination of different refractory metal compounds that will lead to a mixture of ceramics in the composite, which could be beneficial for specific applications.

As noted above, when the metal compound, boron, and carbon precursor composition are heated in a nitrogen atmosphere, metal nitride-containing ceramics may form with a direct incorporation of nitrogen into the lattices of the metal atoms/nanoparticles. Thus, by changing the atmosphere for performing the reaction, one can selectively form either a metal boride/metal carbide/carbon-matrix composition or a metal boride/metal nitride/metal carbide carbon-matrix composition or combination thereof. When the fiber experiments are carried out in a nitrogen atmosphere, fiber reinforced refractory metal boride/metal nitride/metal carbide carbon matrix composites with metal nitride being formed especially on the outer surface. The composite may have outstanding oxidative stability and temperature capabilities in excess of 3000° C.

Shaped solid precursor compositions can be fabricated from the precursor metal component, boron, and carbon source or metal component and boron compositions under pressure. For example when the metal component is a metal hydride, the various precursor compositions may be formulated and milled to convert to very small particle sizes, such as, for example, up to 100 μm or up to 10 μm. Shaped pellets or other shaped components can be formed under pressure to consolidate the small milled particles into intimate contact and with structural integrity for removal from the pressure system followed by thermal conversion to the ceramic. The heating of the shaped precursors occurs from ambient conditions at a very slow rate (such as up to 10, 5, 3, or 2° C./min) to control the rate of decomposition of the metal hydride into the atomic-to-nanoparticle size metal, which is very reactive and will commence to react with the boron and/or carbon source as the nanoparticles form. The heating can occur in vacuum or under inert atmospheres such as argon or nitrogen. By controlling the heating rate and the rate of decomposition of the metal hydride, the metal borides or metal borides/carbides are formed as nanoparticles and the exothermic reaction, as the process occurs, can be readily controlled during the slow heating rate to elevated temperatures necessary to obtain high yields of the nanoparticle ceramics. Since the milled particles of the metal hydride and boron or the metal hydride, boron, and carbon source are in intimate contact, the atoms of each reactants (metal and boron or metal, boron, and carbon atoms) can readily move across the boundaries to ensure strong bonding between the nanoparticle metal borides being formed. As formed, the ceramic nanoparticles (metal borides) show strong interaction within the solid ceramic and the formed solid shaped ceramics exhibit toughness, hardness and structural integrity.

Figure 2:
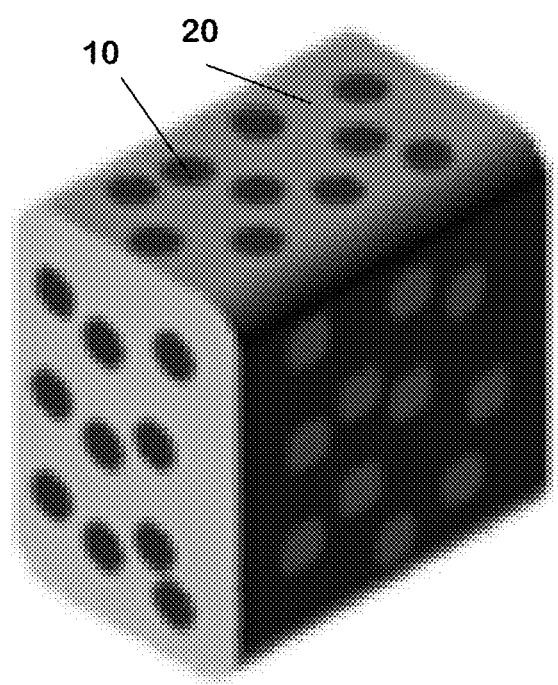
FIG. 2 schematically illustrates metal nanoparticles 10 embedded in a thermoset matrix 20.
Figure 3:
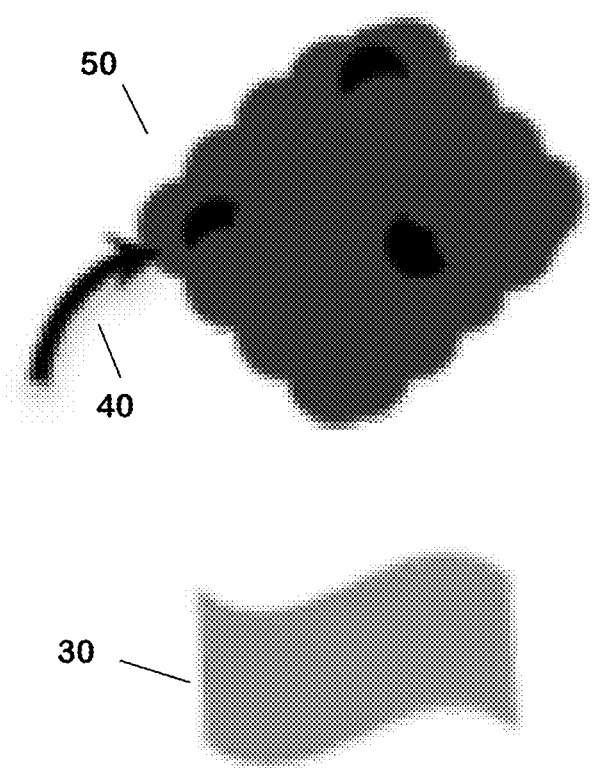
FIG. 3 schematically illustrates the transfer 40 of boron atoms and carbon atoms from the carbon matrix 30 to the nanoparticles 50.
Figure 4:
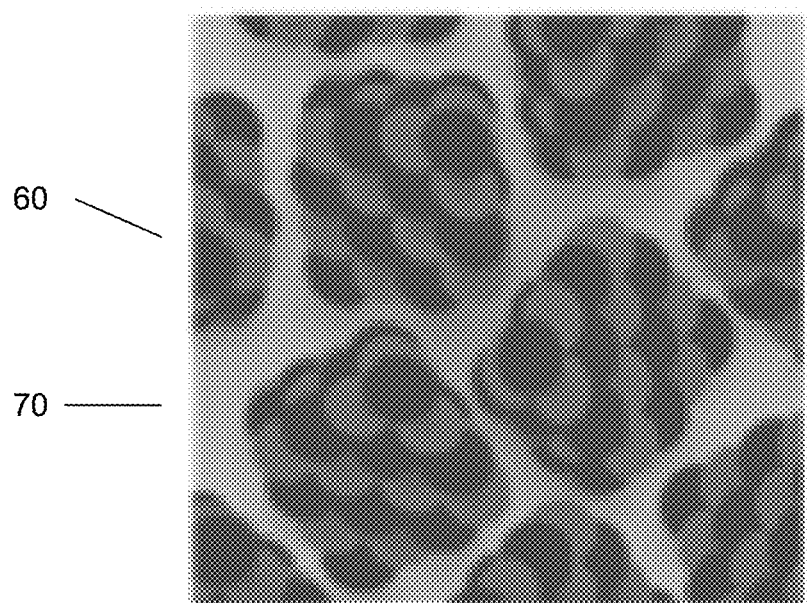
FIG. 4 schematically illustrates metal boride nanoparticles 60 in a carbonaceous matrix 70.

The process is outlined in FIG. 1 and schematically illustrated in FIGS. 2-4. Any reactions described are not limiting of the presently claimed methods and compositions. It is speculated that the nanoparticle form of the refractory metal is highly reactive with the elemental boron and the carbon source, thereby lowering the temperature of the formation of metal borides and metal carbides. Moreover, at least a stoichiometric amount of metal nanoparticles and boron and perhaps a slight excess of boron and a minimum amount of carbon precursor may be included in the precursor composition. Any excess boron would react with the carbon to form boron carbide, which would reduce the amount of metal carbide that can potentially form. This flexibility affords the ability to vary and to tailor the properties of the resulting ceramic carbon matrix composite. The metal boride and metal carbide carbon-matrix composites are expected to show enhanced toughness, owing to the presence of the relatively elastic carbon, which would exist in forms ranging from amorphous to nanotube to graphitic carbon.

The native presence of an "elastic" carbon matrix may allow for toughening of the inherently brittle sintered ceramics. The carbon may permit operation of the toughened ceramic at extremely high temperatures, owing to carbon's high melting point (>3000° C.). Ceramic/carbon-matrix compositions are currently sought for these reasons, and the present method may permit straightforward preparation of these composites in a single step for the first time, in contrast to the traditional means of first forming the ceramic powder and then preparing the metal boride shaped composition under sintering conditions. Only trace or very small amounts of carbon may be needed to achieve the effect. Also, the ratio of ceramic to carbon is easily tuned based on the ratio of metal-compound or metal powder to elemental boron to carbon-precursor.

Fiber-reinforced refractory metal boride carbon matrix composites may exhibit outstanding mechanical properties for usage under extreme environmental high temperature conditions. Finely divided fiber reinforced refractory nanoparticle metal boride carbon composites can allow the consolidation of fully dense shaped solid components with extreme fracture resistance for uses in high stress and temperature applications such as advanced engine components for hypersonic vehicles and automobiles, and for nuclear reactors and fuel cells, where increased operation temperature and mechanical integrity could translate into tremendous economic advantages. The fiber reinforced ceramic composites could be beneficial in the construction of manufacturing facilities needing the high temperature properties and structural integrity of the composites such as in steel mills and coal burning electrical facilities. Such tough, easily shaped ceramic composites are critical to the next generation of jet engines and engines for hypersonic vehicles, which are being designed to operate at higher internal temperatures and stresses than those in current service, in advanced automobile engines and supporting components, and in the design of advanced engine components and supporting structural components. High temperature ship deck plates could be readily fabricated for aircraft carriers needing the superior heat resistant properties of the metal boride/metal carbide ceramic-carbon composites. Also, lightweight, tough, and hard ceramics easily made in controllable forms could be very important for the fabrication of superior military armor; again fabricated in a reactor or mold in a shaped structure. The ability to fabricate tough, shaped refractory metal boride components in one step enhances their importance due to the economic advantages and the elimination of machining to a shaped component.

The disclosed methods can create nanosized metal borides from already well-formed metal nanoparticles within a relatively narrow size range. The process appears to be largely mediated by the high reactivity of the metal nanoparticles toward the boron in excess and the carbon source, above which the kinetics may be determined by the rate of boron and carbon insertion into the metal lattice, and subsequent localization in the appropriate crystallographic positions for formation of the ceramic, implying straightforward control of the rate of the process by temperature.

The formation of ceramic carbon matrix composites via the use of meltable carbon materials is known. However, in these schemes the boride ceramic powder is formed first using different reaction chemistry and then is added to the precursor carbon material which is subsequently charred. It is even possible to form the metal boride powder in a process similar to the one in the preceding paragraph (i.e., formed "atom by atom") by high temperature reaction above 2000° C. from metal oxides and boron carbide with carbon monoxide being formed as by-product. In neither case is the boride ceramic formed from the reaction of metal nanoparticles and elemental boron to produce ceramic nanoparticles, whose concentration can be readily controlled.

In the first step of the method, three components are combined and may be thoroughly mixed. One is a metal component which may be a refractory-metal compound capable of decomposing into refractory metal nanoparticles or particles of a refractory metal. Any refractory metal may be used, including but not limited to a group IV-VI transition metal, titanium, zirconium, hafnium, tungsten, niobium, molybdenum, chromium, tantalum, or vanadium. When a pure metal is used, it may be in the form of nanoparticles or other particles such as a powder. When such metal particles are used, the metal may directly react with the boron or organic component. Suitable powders include, but are not limited to, tungsten and tantalum.

Instead of pure metal, a compound containing the metal atom may be used. Such compounds decompose at elevated temperatures, releasing the metal atoms so that they may react with the boron or organic component. Suitable such compounds include, but are not limited to, a salt, a hydride, a carbonyl compound, or a halide of the refractory metal. Examples include titanium hydride, zirconium hydride, and hafnium hydride. Other examples and embodiments of types of compounds which may be used with the metals disclosed herein may be disclosed in U.S. Pat. Nos. 6,673,953; 6,770,583; 6,846,345; 6,884,861; 7,722,851; 7,819,938; 8,277,534.

The second component is boron in elemental form. Suitable boron is readily available in powder form. A 95-97% boron is suitable with a higher pure boron powder (99%) being preferred. The boron powder may be milled to reduce its particle size.

The third component is an organic compound that has a char yield of at least 60% by weight. The char yield may also be as high as at least 70%, 80%, 90%, or 95% by weight. The char yield of a potential compound may be determined by comparing the weight of a sample before and after heating to at least 1000° C. for at least 1 hr in an inert atmosphere such as nitrogen or argon. Any such compounds with high char yields may be used as the charring may play a role in the mechanism of the reactions. This char yield may be measured at an elevated pressure to be used when a heating step is also performed at such pressure. Thus, a compound having a low char yield at atmospheric pressure but having a high char yield under external pressure or the conditions that the disclosed methods are performed may be suitable for producing metal borides, carbides, and nitrides. The organic compound may be omitted to form pure metal boride and optionally metal nitride.

Certain organic compounds may exhibit any of the following characteristics, including mutually consistent combinations of characteristics: containing only carbon and hydrogen; containing aromatic and acetylene groups; containing only carbon, hydrogen, and nitrogen or oxygen; containing no oxygen; and containing a heteroatom other than oxygen. It may have a melting point of at most 400° C., 350° C., 300° C., 250° C., 200° C. or 150° C. and the melting may occur before polymerization or degradation of the compound. Examples of organic compounds include, but are not limited to, 1,2,4,5-tetrakis(phenylethynyl)benzene (TPEB), 4,4'-diethynylbiphenyl (DEBP), N,N'-(1,4-phenylenedimethylidyne)-bis(3-ethynylaniline) (PDEA), N,N'-(1,4-phenylenedimethylidyne)-bis(3,4-dicyanoaniline) (dianilphthalonitrile), and 1,3-bis(3,4-dicyanophenoxy)benzene (resorcinol phthalonitrile) or a prepolymer thereof. Prepolymers may also be used, such as a prepolymer of TPEB or other suitable organic compounds. Different compounds can be blended together and/or reacted to a prepolymer stage before usage as the organic compound of the precursor composition. The presence of nitrogen atoms in the organic compound may produce metal nitrides in the ceramic without the use of a nitrogen atmosphere.

More than one metal, metal compound, and/or organic compound may be used. Two or more different metals may be used to produce two different metal borides, carbides, and/or nitrides in the ceramic. Also, in some cases only one compound may be used when the metal component and the organic component are the same compound. Such compounds may be high in carbon and hydrogen to produce a high char yield, but also have a refractory metal bound to the compound.

An optional component in the precursor materials is a plurality of fibers or other fillers. Examples of fibers include, but are not limited to, carbon fibers, ceramic fibers, and metal fibers. The fibers may be of any dimension that can be incorporated into the mixture and may be cut or chopped to shorter dimensions.

The precursor mixture, which may be mixed in a melt stage and/or consolidated under pressure, then undergoes a heating step to form a metal nanoparticle composition. This may be performed while the mixture is in a mold. This will allow the final product to have the same shape as the mold, as the organic component of the mixture will melt if not already liquid and the mixture will fill the mold during the heating, and retain its shape when the ceramic is formed. The precursor mixture is heated in an inert atmosphere at a temperature that causes decomposition of the refractory-metal compound to form refractory-metal nanoparticles. If the organic compound is volatile, the heating may be performed under pressure to avoid evaporation of the organic compound. As used herein, this heating step includes the formation of nanoparticles from a metal powder. As the reaction proceeds from the metal powder, the metal particles will become smaller. It is not necessary to verify that the nanoparticles are formed in order to continue with the method. However, any known technique for detecting nanoparticles such as SEM, TEM, or x-ray diffraction analysis (XRD) may be used if desired to verify that the metal component suitably produces nanoparticles. Suitable heating temperatures include, but are not limited to, 150-500 or 700° C.

Heating the precursor may also cause the polymerization of the organic compound to a thermoset. The metal nanoparticles 10 would then be dispersed throughout the thermoset 20 as shown in FIG. 2. The organic compound may also polymerize before the nanoparticles are formed. A thermoset having the refractory-metal compound or particles (including nanoparticles) of refractory metal dispersed throughout may be used as a final product. The thermoset may also be machined to a desired shape, followed by heating to form a ceramic as described below. The thermoset is not formed if the organic compound is omitted.

The metal source may be homogeneously distributed or embedded in the thermoset as an intermediate shaped solid. At this stage, the composition may have a shape that it will retain upon further heating and conversion to the ceramic from reaction of the metal source with the developing carbon matrix.

The precursor mixture may be consolidated to a shaped solid component under pressure to promote intimate contact of the reactants to provide a very dense ceramic solid or to densify the final product. The precursor mixture may be compacted under exterior pressure, removed from the pressure, and then heated to a thermoset followed by conversion to the ceramic. Alternatively, the precursor mixture may be compacted under exterior pressure and the pressure maintained while heating to the thermoset and ceramic.

In a second heating step, the metal nanoparticle composition is heated to form a ceramic. The heating is performed at a temperature that causes formation of nanoparticles of a refractory-metal boride 60 and a refractory-metal carbide in a carbonaceous matrix 70 (FIG. 4). The carbonaceous matrix may comprise graphitic carbon, carbon nanotubes, and/or amorphous carbon. There is no carbonaceous matrix if the organic compound is omitted. If nitrogen is present, metal nitride nanoparticles may be formed. There may be a higher concentration of nitrides on the surface than in the interior. Suitable heating temperatures include, but are not limited to 500-1900° C.

Nanoparticles that may be formed include, but are not limited to, titanium boride, titanium carbide, zirconium boride, zirconium carbide, hafnium boride, hafnium carbide, tungsten boride, tungsten carbide, tantalum boride, tantalum carbide, and $HfraC_2$. The presence and composition of the metal boride or carbide particles may be verified by any known technique for detecting nanoparticles such as SEM, TEM, or XRD. The nanoparticles may have an average diameter of less than 100 nm, 50 nm, or 30 nm. They may be generally spherical in shape or may be non-spherical, such as nanorods.

The ceramic may include any amount of nanoparticles, including but not limited to, at least 5%, 10%, 20%, 30%, 40%, 50%, 60%, 70%, 80%, 90%, 95%, or 99% by weight of nanoparticles. The percentage of nanoparticles may be in part determined by the molar ratio of metal to boron and carbon atoms in the precursor mixture. At a 1:1 ratio, nearly all of the boron and carbon may be incorporated into the nanoparticles, leaving a small amount or trace of carbonaceous matrix. Higher amounts of boron may result in a higher ratio of metal boride to metal carbide nanoparticles. With higher amounts of organic compound, the fraction of metal carbide nanoparticles is lower and the fraction of carbonaceous matrix is higher. By this method, variations in the ratio of metal to boron to organic may be used, affording a mixture of metal boron and metal carbide when performed in an inert atmosphere such as argon and metal boron, metal carbide, and metal nitride when performed in a nitrogen atmosphere. When metal nitrides are made, raising the amount of carbon in the precursor mixture may lower the amount of metal nitride in the ceramic. When the organic compound is omitted, then the product is nearly all nanoparticles.

The ceramic is not formed as a powder and may be in the form of a solid, unbroken mass. It may contain less than 20% by volume of voids or as low as 10%, 5%, or 1%. It may have the same shape as the precursor mixture (if solid) or it may take on the shape of a mold it was placed in during the heating. The ceramic may retain its shape in that it does not crumble when handled and may not change shape or break without the use of extreme force. The ceramic composition may be tough, hard, and have structural integrity. The degree of such properties may depend on the amount of ceramic to carbon in the solid ceramic composition. Any shape may be formed to make an article useful for incorporation into an apparatus. The article may be large enough to have a minimum size of at least 1 cm in all dimensions. That is, the entire surface of the article is at least 5 mm from the center of mass of the article. Larger articles may be made, such as having a minimum size of at least 10 cm in all dimensions. Also, the composition may have smaller sizes, such as 1 mm, 2 mm, or 5 mm.

A third heating step may also be performed, where the ceramic is heated in an oxygen-containing atmosphere to form an oxide of the refractory metal on the surface of the ceramic. For example, titanium oxide may be formed on the surface. Such surface oxidation may protect the interior of the ceramic from further oxidation.

The following examples are given to illustrate specific applications. These specific examples are not intended to limit the scope of the disclosure in this application. Any other appropriate methods and materials disclosed in US Provisional Application Nos. 61/590,852; 61/640,744; 61/669,201; 61/693,930 may be used. Any carbon source, elemental boron source, metal compound, and/or other parameter disclosed therein may be used in any combination in the presently disclosed method, and may be combined with any material and/or parameter disclosed in the present application.

Example 1

Formulation of precursor composition of $TiH_2$, boron, and TPEB in a ratio of 1:2.1:0.01—TPEB (0.129 g; 0.270 mmol), boron (0.455 g, 42.1 mmol), and $TiH_2$ (1.00 g; 20.0 mmol) were thoroughly mixed and used as the precursor composition for the formation of refractory nanoparticle ($TiB_2$) embedded or bonded with the excess of carbon that behaves as a matrix material. The ratio of the three reactants can be readily varied by the described formulation method.

Example 2

Preliminary TGA-DSC thermal analysis study to determine the conditions for formation of refractory $TiB_2$ ceramic solid in one step by heating at 10° C./min to 1400° C. under an argon atmosphere—A sample (16.8960 mg) of the precursor composition prepared in Example 1 was weighed into a TGA ceramic pan, flushed for 15 min in a flow (110 cc/min) of argon, and then heated in a TGA chamber at 10° C./min to 1400° C. using a Q600 TGA-DSC TA Instrument yielding a solid ceramic material. The DSC thermogram showed a small melting point endotherm at about 194° C. (TPEB) and an exothermic transition peaking at about 282° C. (reaction/cure of ethynyl groups of TPEB to form shaped thermoset polymer). As the heating was continued, the DSC thermogram showed a combination of transitions (endotherms and exotherms) commencing above 480° C. with an endotherm at about 533° C. followed by an exotherm peaking at about 590° C. During the thermal treatment to 1400° C., the sample lost only a small amount of weight with retention of 96.78% weight at 1400° C. The ceramic carbon solid composition was formed in one step and exhibited structural integrity.

Example 3

Figure 5:
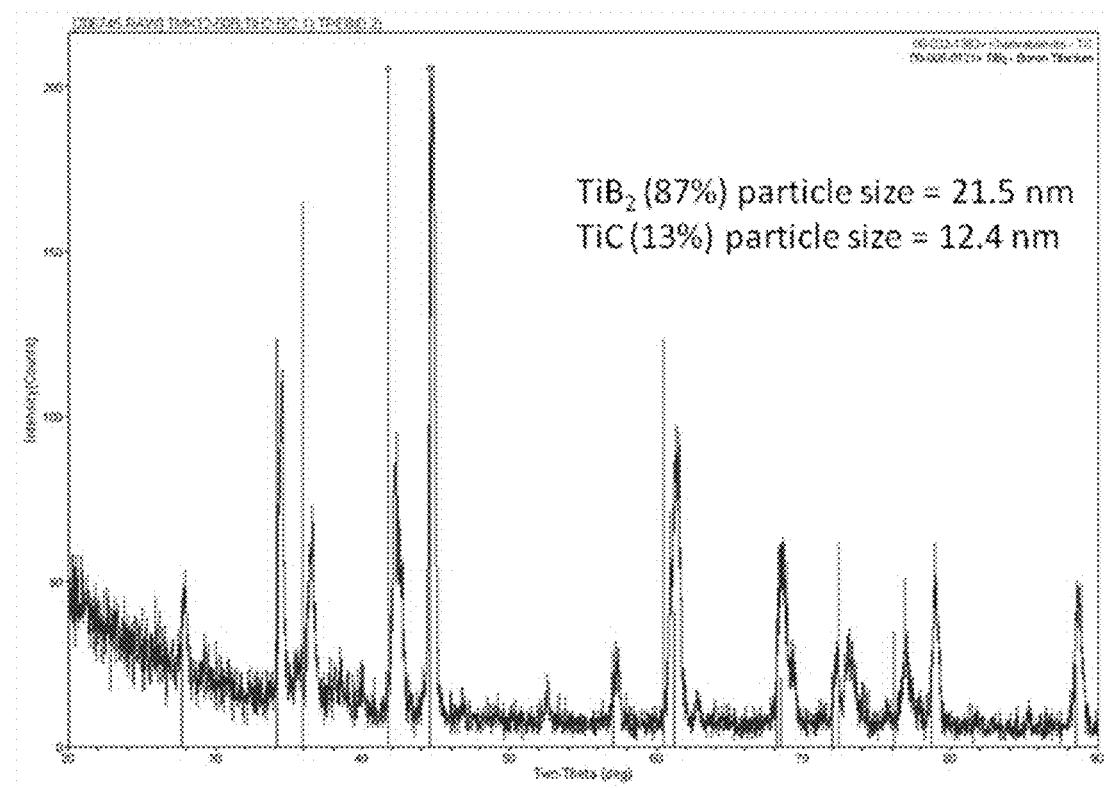
FIG. 5 shows an X-ray diffraction analysis (XRD) of a sample containing $TiB_2$ and TiC nanoparticles.
Figure 6:
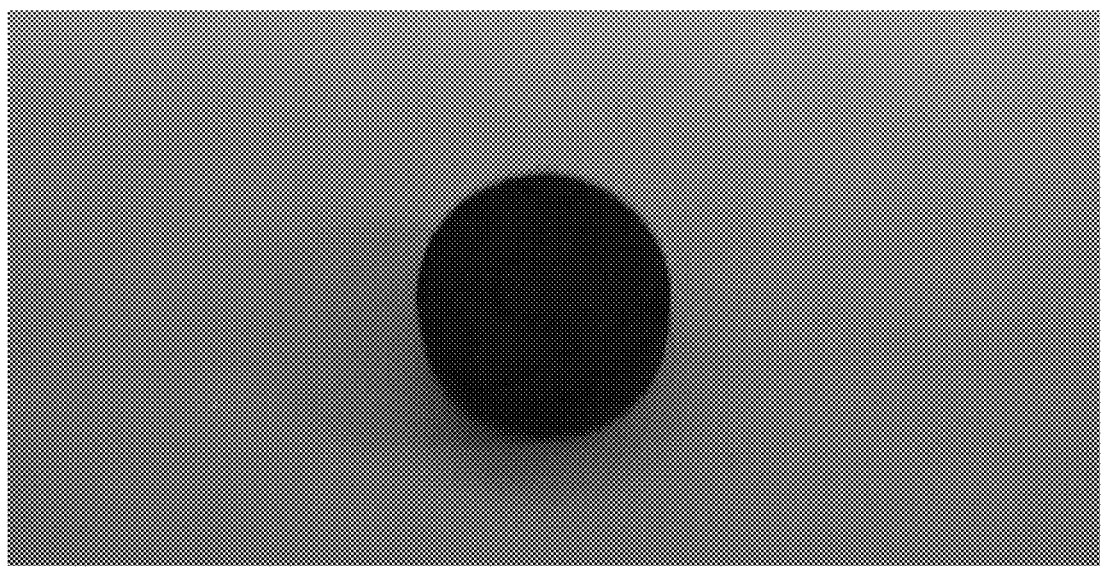
FIG. 6 shows a photograph of a sample containing $TiB_2$ and TiC nanoparticles.

Formation of nanoparticle refractory $TiB_2$ ceramic solid in one step by controlled heating to 1300° C. under an argon atmosphere—A sample (88.8430 mg) of the precursor composition prepared in Example 1 was weighed into a TGA ceramic pan, packed with a flat surface, and heated in a TGA chamber under an argon atmosphere at 10° C./min to and at 250° C. for 2 hr to consolidate to a shaped solid thermoset polymer. During the heat treatment to 250° C., the sample showed an endothermic transition at about 195° C. attributed to the melting point of TPEB. The isothermal heat treatment at 250° C. resulted in the reaction of the ethynyl units in the TPEB and conversion to the shaped thermoset polymer. The solid polymeric sample composed of $TiH_2$ and boron embedded in the polymeric thermoset was then slowly heated at 3° C./min to and at 1300° C. for 3 hr affording a solid ceramic material with weight retention of 96.06%. Above 400° C., degradation of the $TiH_2$ occurred to Ti nanoparticles and $H_2$; the $H_2$ vaporized from the sample. Further heating above 500° C. to 1300° C. resulted in the reaction of the highly reactive Ti nanoparticles with the developing carbon atoms being formed from the carbonization of TPEB during the heat treatment resulting in the formation of high yields of $TiB_2$ nanoparticles and a small amount of TiC nanoparticles embedded in the excess carbon formed during the simple carbonization process. More importantly, the nanoparticle refractory ceramic carbon matrix composite was formed in one step. XRD analysis (FIG. 5) of the solid sample showed a clean reaction with the formation of $TiB_2$ (87%) and TiC (13%). The particle size for the $TiB_2$ was 21.5 nm and for TiC it was 12.4 nm. FIG. 6 shows a photograph of a typical sample.

Example 4

Formulation of precursor composition of $ZrH_2$, boron, and TPEB (1:1:0.02)—TPEB (0.100 g; 0.209 mmol), boron (0.115 g, 10.6 mmol), and $ZrH_2$ (1.00 g; 10.7 mmol) were thoroughly mixed and used as the precursor composition for the formation of refractory nanoparticle $ZrB_2$ embedded or bonded with the excess of carbon that behaves as a matrix material. The ratio of the three reactants can be readily varied by the described formulation method.

Example 5

Formation of refractory $ZrB_2$ solid ceramic composition in one step by heating at 10° C./min to 1400° C. under an argon atmosphere—A sample (12.1180 mg) of the precursor composition prepared in Example 4 was weighed into a TGA ceramic pan, packed with a flat surface, and heated in a TGA chamber at 10° C. under a flow (110 cc/min) of argon to 1400° C. yielding a solid material with a weight retention of 98.03%. During the heat treatment, the sample melted at about 194° C. (endothermic transition; TPEB) and exhibited an exothermic transition peaking at about 292° C. attributed to the cure to a shaped solid thermoset polymer. After cooling from 1400° C. to room temperature, the solid ceramic composition was removed from the TGA pan. The shaped solid ceramic refractory $ZrB_2$ ceramic carbon composite was formed in one step, appeared hard, and exhibited structural integrity.

Example 6

Formation of nanoparticle refractory $ZrB_2$ ceramic solid in one step by controlled heating of 3° C./min to 1300° C. under an argon atmosphere—A sample (115.7420 mg) of the powdered composition prepared as in Example 4 was weighed into a TGA ceramic pan, packed with a flat surface, and heated in a TGA chamber under a flow (110 cc/min) of argon at 5° C./min to and at 250° C. for 1 hr to consolidate to a shaped solid thermoset polymer. During the heat treatment, the sample showed an endothermic transition at about 195° C. attributed to the melting point of TPEB. The isothermal heat treatment at 250° C. resulted in the reaction of the ethynyl units in the TPEB and conversion to the shaped solid thermoset polymer. The resulting thermoset polymer contained a homogeneous distribution of $ZrH_2$ and boron embedded in the domain of the polymer. Further heating above 500° C. resulted in the degradation of the $ZrH_2$ to Zr nanoparticles and $H_2$; the $H_2$ vaporized from the sample as formed. The solid thermoset polymer sample was slowly heated at 3° C./min to 1300° C. and held at this temperature for 3 hr affording a solid ceramic material with a weight retention of 93.27%. Heating from 500° C. to 1300° C. resulted in the reaction of the highly reactive Zr nanoparticles with the boron and the developing carbon atoms being formed from degradation of TPEB during the simple carbonization process resulting in the formation of $ZrB_2$ and ZrC nanoparticles embedded in excess carbon. More importantly, the novel refractory metal ceramic carbon matrix composition was formed in one step. XRD analysis showed a high yield of pure $ZrB_2$ and ZrC nanoparticles embedded in an amorphous carbon matrix as the products formed during the heat treatment. The XRD studies showed about a 50/50 amount of $ZrB_2$ and ZrC nanoparticles with average particle sizes of 35 nm and 32 nm for $ZrB_2$ and ZrC, respectively, within the solid carbon ceramic composition.

Example 7

Formulation of precursor composition of $ZrH_2$, boron, and TPEB (1:2.0:0.02)—TPEB (0.100 g; 0.209 mmol), boron (0.233 g, 21.5 mmol), and $ZrH_2$ (1.00 g; 10.7 mmol) were thoroughly mixed and used as the precursor composition for the formation of refractory nanoparticle $ZrB_2$ embedded or bonded with the excess of carbon that behaves as a matrix material. The ratio of the three reactants can be readily varied by the described formulation method.

Example 8

Figure 7:
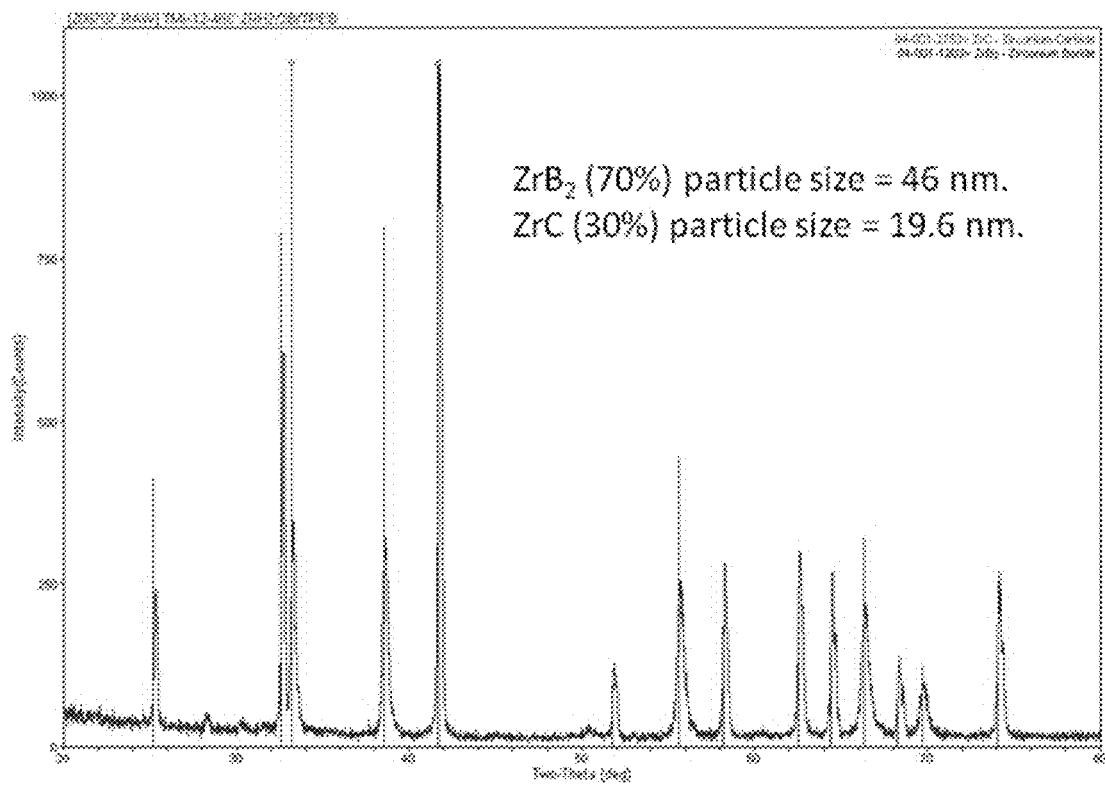
FIG. 7 shows an XRD of a sample containing $ZrB_2$ and ZrC nanoparticles.
Figure 8:
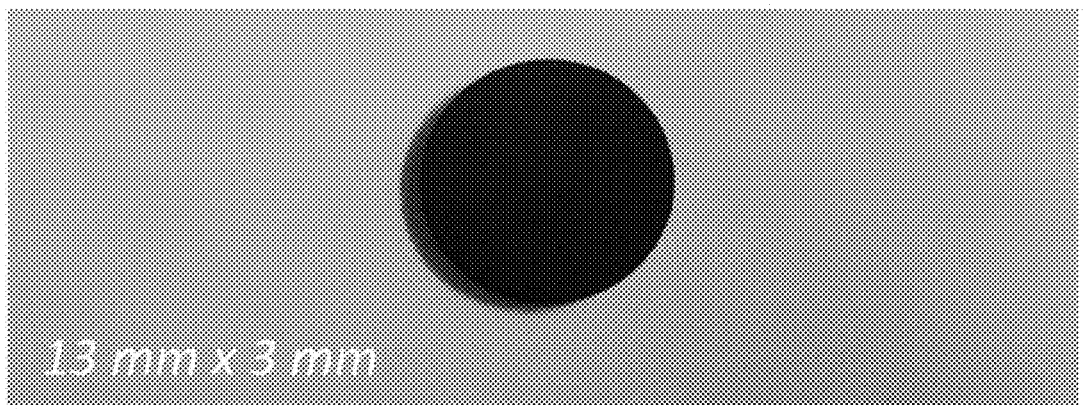
FIG. 8 shows a photograph of a sample containing $ZrB_2$ and ZrC nanoparticles.

Formation of high yield of nanoparticle refractory $ZrB_2$ relative to ZrC nanoparticle in solid ceramic produced in one step by controlled heating at 3° C./min to 1400° C. under an argon atmosphere using stoichiometric amount of boron—A sample (115.7420 mg) of the powdered composition prepared as in Example 7 was weighed into a TGA ceramic pan, packed with a flat surface, and heated in a TGA chamber under a flow (110 cc/min) of argon at 5° C./min to and at 250° C. for 1 hr to consolidate to a shaped solid thermoset polymer. During the heat treatment, the sample showed an endothermic transition at about 195° C. attributed to the melting point of TPEB. The isothermal heat treatment at 250° C. resulted in the reaction of the ethynyl units in the TPEB and conversion to the shaped solid thermoset polymer. The resulting thermoset polymer contained a homogeneous distribution of 1 mole of $ZrH_2$ and 2 moles of boron embedded in the domain of the polymer. Further heating above 500° C. resulted in the degradation of the $ZrH_2$ to Zr nanoparticles and $H_2$; the $H_2$ vaporized from the sample as formed. The solid thermoset polymer sample was slowly heated at 3° C./min to 1400° C. and held at this temperature for 3 hr affording weight retention of 97.27% of a ceramic solid with structural integrity. Heating from 500° C. to 1400° C. resulted in the reaction of the highly reactive Zr nanoparticles with the boron and the developing carbon atoms being formed from degradation of TPEB during the simple carbonization process resulting in the formation of $ZrB_2$ and ZrC nanoparticles embedded in excess carbon. The refractory metal ceramic carbon matrix composition was formed in one step. XRD analysis (FIG. 7) showed a high yield of pure $ZrB_2$ nanoparticles relative to ZrC nanoparticles embedded in an amorphous carbon matrix as the products formed during the heat treatment. The XRD studies showed about a 75/25 amount of $ZrB_2$ and ZrC nanoparticles with average particle sizes of 46 nm and 19.6 nm for $ZrB_2$ and ZrC, respectively. FIG. 8 shows a photograph of a typical sample.

Example 9

Formulation of precursor composition of $ZrH_2$, boron, and TPEB (1:2:0.006)—TPEB (0.033 g; 0.069 mmol), boron (0.233 g, 21.5 mmol), and $ZrH_2$ (1.00 g; 10.7 mmol) were thoroughly mixed and used as the precursor composition for the formation of refractory nanoparticle $ZrB_2$ embedded or bonded with the excess of carbon that behaves as a matrix material. The ratio of the three reactants can be readily varied by the described formulation method.

Example 10

Formation of high yield of nanoparticle refractory $ZrB_2$ relative to ZrC nanoparticle in ceramic solid produced in one step by controlled heating at 3° C./min to 1300° C. under an argon atmosphere using stoichiometric amount of boron and smaller amount of TPEB—A sample (114.8850 mg) of the powdered composition prepared as in Example 9 was weighed into a TGA pan, packed with a flat surface, and heated in a TGA chamber under a flow (110 cc/min) of argon at 10° C./min to and at 250° C. for 1 hr to consolidate to a shaped solid thermoset polymer. The isothermal heat treatment at 250° C. resulted in the reaction of the ethynyl units in the TPEB and conversion to the shaped solid thermoset polymer. The resulting thermoset polymer contained a homogeneous distribution of $ZrH_2$ and boron embedded in the domain of the polymer. The solid thermoset polymer sample was slowly heated at 3° C./min to 1300° C. and held at this temperature for 3 hr affording weight retention of 98.01% of a ceramic solid with structural integrity. Heating from 500° C. to 1300° C. resulted in the reaction of the highly reactive Zr nanoparticles with the boron and the developing carbon atoms being formed from degradation of TPEB presence in a smaller quantity compared to precursor compositions of Examples 4 and 7. The refractory metal ceramic carbon matrix composition was formed in one step. XRD analysis showed a high yield of pure $ZrB_2$ nanoparticles relative to ZrC nanoparticles embedded in an amorphous carbon matrix as the products formed during the heat treatment. The XRD studies showed about an 85% yield of $ZrB_2$ nanoparticles and 15% yield of ZrC nanoparticles with average particle sizes of 29.3 nm and 27.9 nm for $ZrB_2$ and ZrC, respectively.

Example 11

Formulation of precursor composition of $HfH_2$, boron, and TPEB (1:2.1:0.01)—TPEB (0.035 g; 0.073 mmol), boron (0.126 g, 11.6 mmol) and $HfH_2$ (1.00 g; 5.56 mmol) were thoroughly mixed and used as the precursor composition for the formation of refractory nanoparticle $HfB_2$ embedded or bonded with the excess of carbon that behaves as a matrix material. The ratio of the two reactants can be readily varied by the described formulation method.

Example 12

Preliminary TGA-DSC thermal analysis study to determine the conditions for formation of refractory $HfB_2$ ceramic solid in one step by heating at 10° C./min to 1400° C. under an argon atmosphere—A sample (30.9100 mg) of the precursor composition prepared in Example 11 was weighed into a ceramic pan, packed with a flat surface, flushed for 15 min in a flow (110 cc/min) of argon, and then heated in a TGA chamber at 10° C./min to 1400° C. using a Q600 TGA-DSC TA Instrument yielding a solid ceramic material with a weight retention of 98.47%. The DSC thermogram showed a small melting point endotherm at about 194° C. (TPEB) and an exothermic transition peaking at about 282° C. (reaction/cure of ethynyl groups of TPEB to form shaped thermoset polymer). The DSC thermogram showed two exothermic transitions peaking at about 535° C. and 728° C. As the heating was continued, the DSC thermogram was flat until about 1142° C. but started to exhibit an exothermic transition, which continued to the final temperature of 1400° C. During the thermal treatment to 1400° C., the sample lost only a small amount of weight with retention of 98.47% at 1400° C. The ceramic carbon solid composition was formed in one step and exhibited structural integrity.

Example 13

Figure 9:
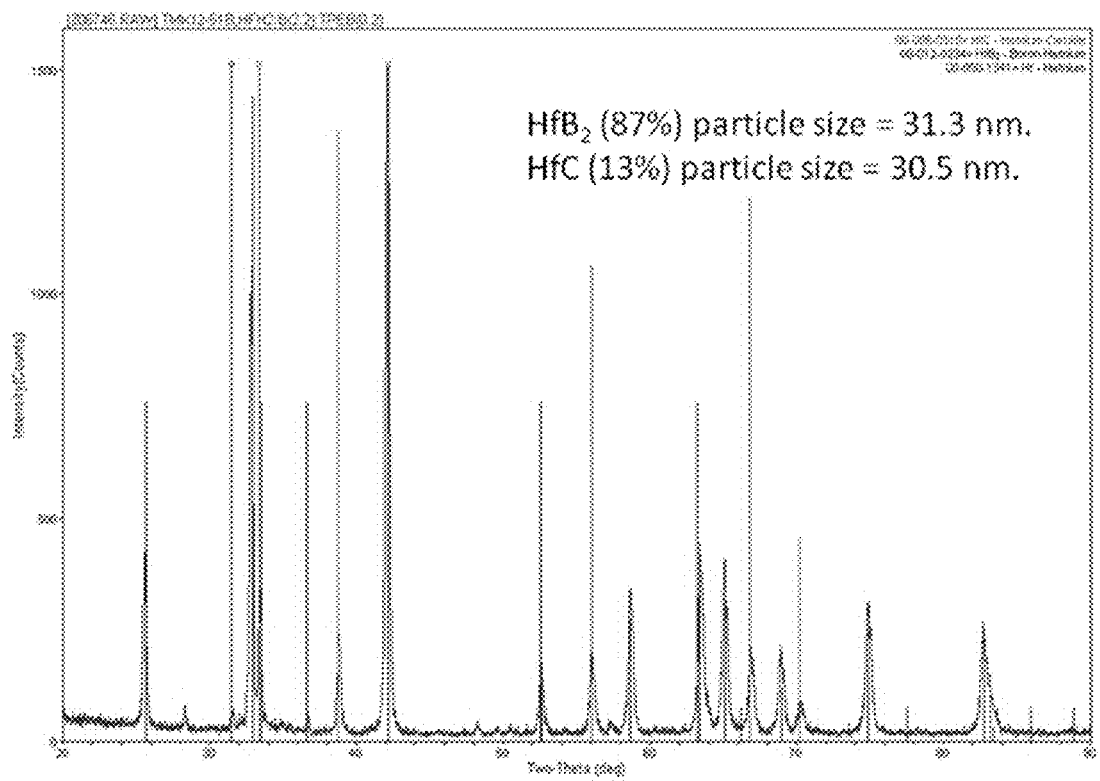
FIG. 9 shows an XRD of a sample containing $HfB_2$ and HfC nanoparticles.
Figure 10:
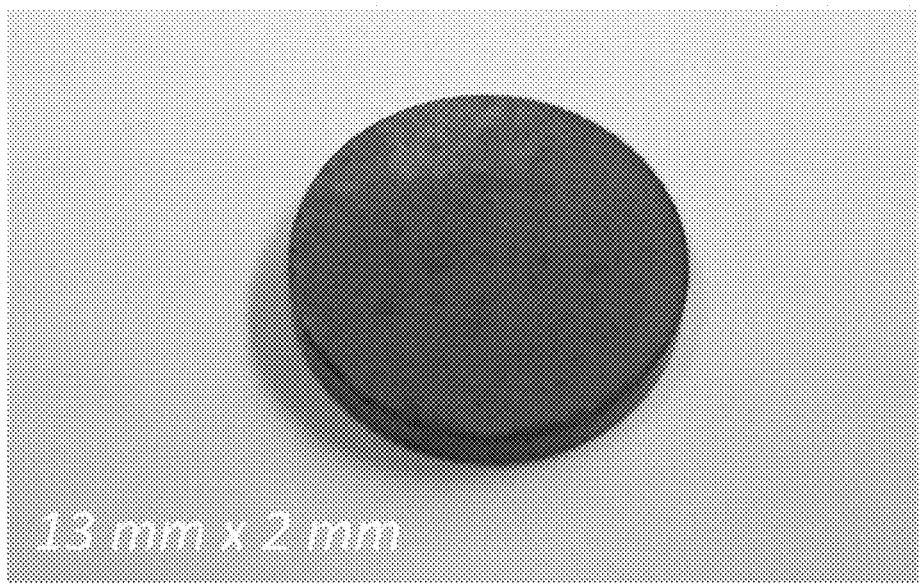
FIG. 10 shows a photograph of a sample containing $HfB_2$ and HfC nanoparticles.

Formation of nanoparticle refractory $HfB_2$ solid ceramic in one step by controlled heating at 3° C./min to 1300° C. under an argon atmosphere—A sample (115.7420 mg) of the powdered composition prepared as in Example 11 was weighed into a ceramic pan, packed with a flat surface, and heated in a TGA chamber under a flow (110 cc/min) of argon at 10° C./min to and at 250° C. for 1 hr to consolidate to a shaped solid thermoset polymer. During the heat treatment, the sample showed an endothermic transition at about 195° C. attributed to the melting point of TPEB. The isothermal heat treatment at 250° C. resulted in the reaction of the ethynyl units in the TPEB and conversion to the shaped solid thermoset polymer. The resulting thermoset polymer contained a homogeneous distribution of $HfH_2$ and boron embedded in the domain of the polymer. Further heating above 500° C. resulted in the degradation of the $HfH_2$ to Hf nanoparticles and $H_2$; the $H_2$ vaporized from the sample as formed whereas the highly reactive Hf nanoparticles interact with the elemental boron and carbon atoms being formed from carbonization of the TPEB. The solid thermoset polymer sample was slowly heated at 3° C./min to and at 1300° C. for 3 hr affording weight retention of 98.49% of a ceramic solid with structural integrity. The novel refractory metal ceramic carbon matrix composition was formed in one step. XRD analysis (FIG. 9) showed high yield of pure $HfB_2$ (87%) and HfC (13%) nanoparticles embedded in an amorphous carbon matrix as the products formed during the heat treatment. The XRD studies showed average particle sizes of 31.3 nm and 30.5 nm for $HfB_2$ and HfC, respectively. FIG. 10 shows a photograph of a typical sample.

Example 14

Formulation of precursor composition of tungsten, boron, and TPEB (1:1.2:0.01)—TPEB (0.018 g; 0.038 mmol), boron (0.035 g, 3.24 mmol), and tungsten (0.500 g; 2.72 mmol) powder were thoroughly mixed and used as the precursor composition for the formation of refractory nanoparticle WB embedded or bonded with the excess of carbon that behaves as a matrix material. The ratio of the three reactants can be readily varied by the described formulation method.

Example 15

Preliminary TGA-DSC thermal analysis study to determine the conditions for formation of refractory WB ceramic solid in one step by heating at 10° C./min to 1400° C. under an argon atmosphere—A sample (16.8960 mg) of the precursor composition prepared in Example 14 was weighed into a ceramic pan, packed with a flat surface, flushed for 15 min in a flow (110 cc/min) of argon, and then heated in a TGA chamber at 10° C./min to 1400° C. using a Q600 TGA-DSC TA Instrument yielding a solid ceramic material with a weight retention of 97.03%. During the thermal treatment to 1400° C., the sample exhibited a small exotherm peaking at about 1100° C. and a more intense exotherm commencing at about 1188° C. The ceramic carbon solid composition exhibited structural integrity.

Example 16

Figure 11:
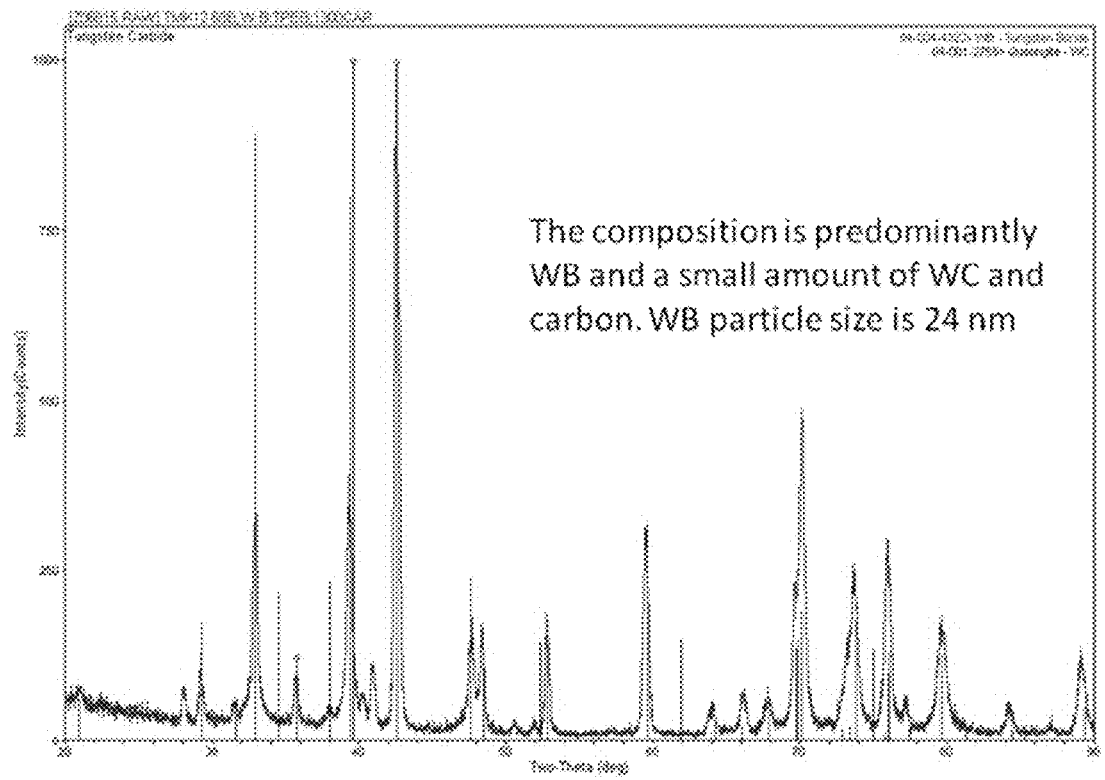
FIG. 11 shows an XRD of a sample containing $WB_2$ and WC nanoparticles.

Formation of nanoparticle refractory WB solid ceramic in one step by controlled heating at 2° C./min to 1300° C. under an argon atmosphere—A sample (115.7420 mg) of the powdered composition prepared as in Example 14 was weighed into a ceramic pan, packed with a flat surface, flushed with argon for 15 min, and then heated in a TGA chamber under a flow (110 cc/min) of argon at 10° C./min to and at 250° C. for 1 hr to consolidate to a solid shaped thermoset polymer. During the heat treatment, the sample showed an endothermic transition at about 195° C. attributed to the melting point of TPEB. The isothermal heat treatment at 250° C. resulted in the reaction of the ethynyl units in the TPEB and conversion to the shaped solid thermoset polymer. The resulting thermoset polymer contained a homogeneous distribution of tungsten powder and elemental boron embedded in the domain of the polymer. Further heating of the thermoset polymer composition resulted in the microsized tungsten particles interacting with the elemental boron and the carbon atoms being formed from carbonization of the TPEB. The solid thermoset polymer sample was slowly heated at 2° C./min to and at 1300° C. for 3 hr affording weight retention of 97.31% of a carbon ceramic solid. The refractory metal ceramic carbon matrix composition was formed in one step and retained its structural integrity. XRD analysis (FIG. 11) showed a high yield of pure predominately WB nanoparticles with an average particle size of 24 nm along with a small amount of WC nanoparticle embedded in an amorphous carbon matrix.

Example 17

Formulation of precursor composition of tantalum, boron, and TPEB (1:2.1:0.01)—TPEB (0.018 g; 0.038 mmol), boron (0.063 g, 5.83 mmol), and tantalum (0.500 g; 2.76 mmol) were thoroughly mixed and used as the precursor composition for the formation of refractory nanoparticle $TaB_2$ embedded or bonded with the excess of carbon that behaves as a matrix material. The ratio of the three reactants can be readily varied by the described formulation method.

Example 18

Figure 12:
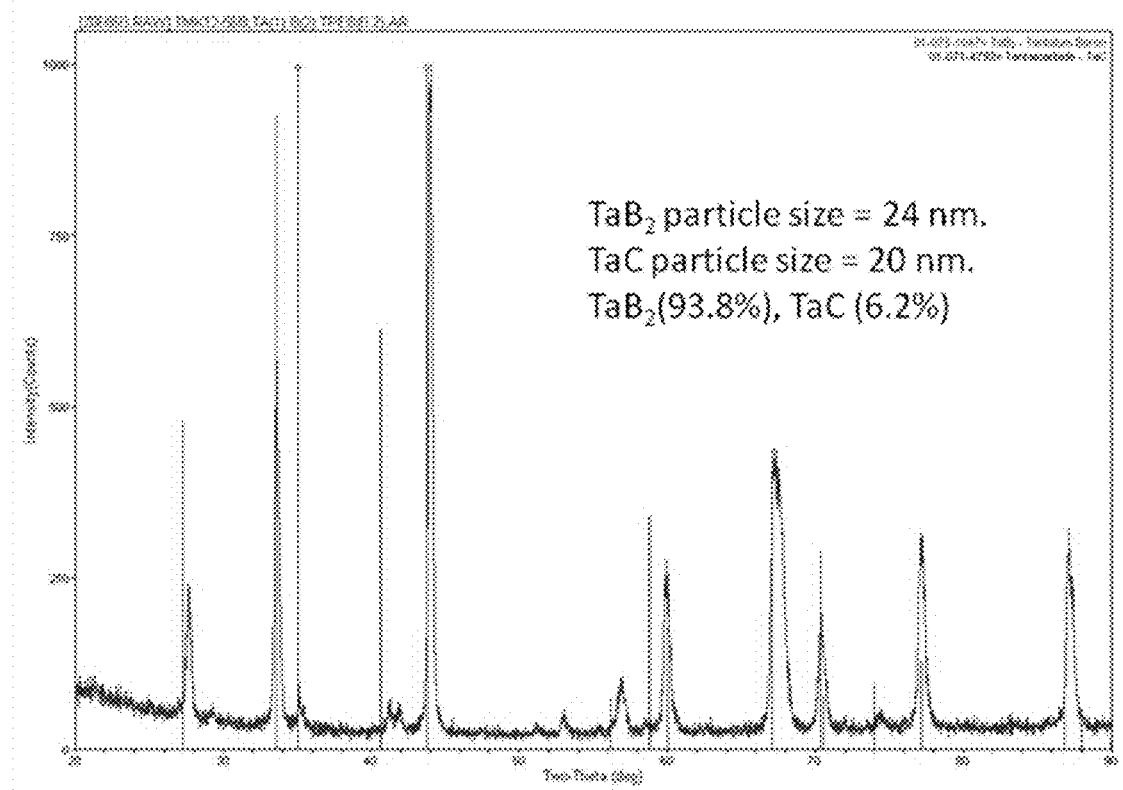
FIG. 12 shows an XRD of a sample containing $TaB_2$ and TaC nanoparticles.
Figure 13:
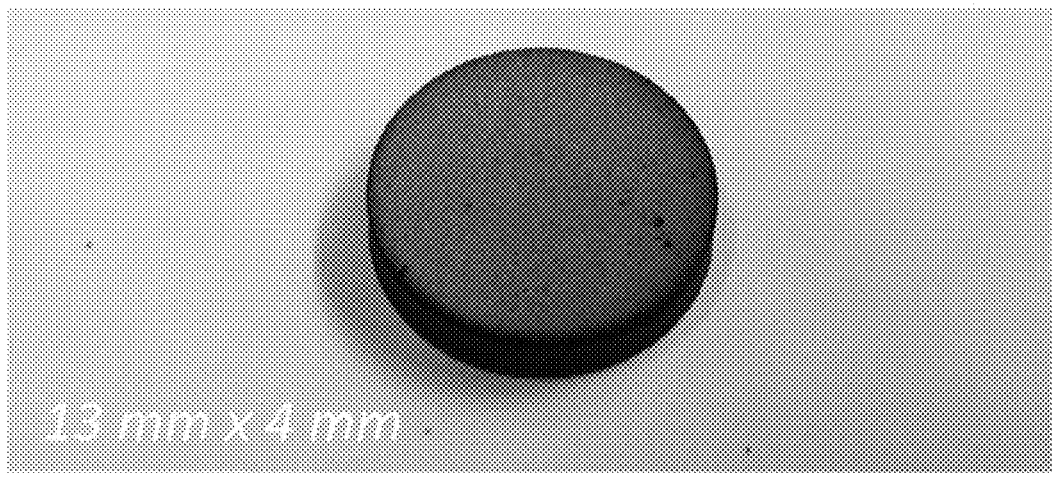
FIG. 13 shows a photograph of a sample containing $TaB_2$ and TaC nanoparticles.

Formation of nanoparticle refractory $TaB_2$ ceramic solid in one step by controlled heating to 1400° C. under an argon atmosphere—A sample (100.3100 mg) of precursor composition prepared as in Example 17 was weighed into a ceramic pan, packed with a flat surface, flushed for 15 min in a flow (110 cc/min) of argon, and then heated in a TGA chamber at 10° C./min to and at 250° C. for 1 hr. The resulting solid thermoset polymer was then heated at 2° C./min to and at 1300° C. for 3 hr followed by heating at 1° C./min to and at 1400° C. for 1 hr. XRD analysis (FIG. 12) showed high yield of $TaB_2$ (93.8%) and a small amount of TaC (6.2%) nanoparticles within the solid ceramic composition. The XRD studies showed average particle sizes of 24 nm and 20 nm for $TaB_2$ and TaC, respectively. FIG. 13 shows a photograph of a typical sample.

Example 19

Figure 14:
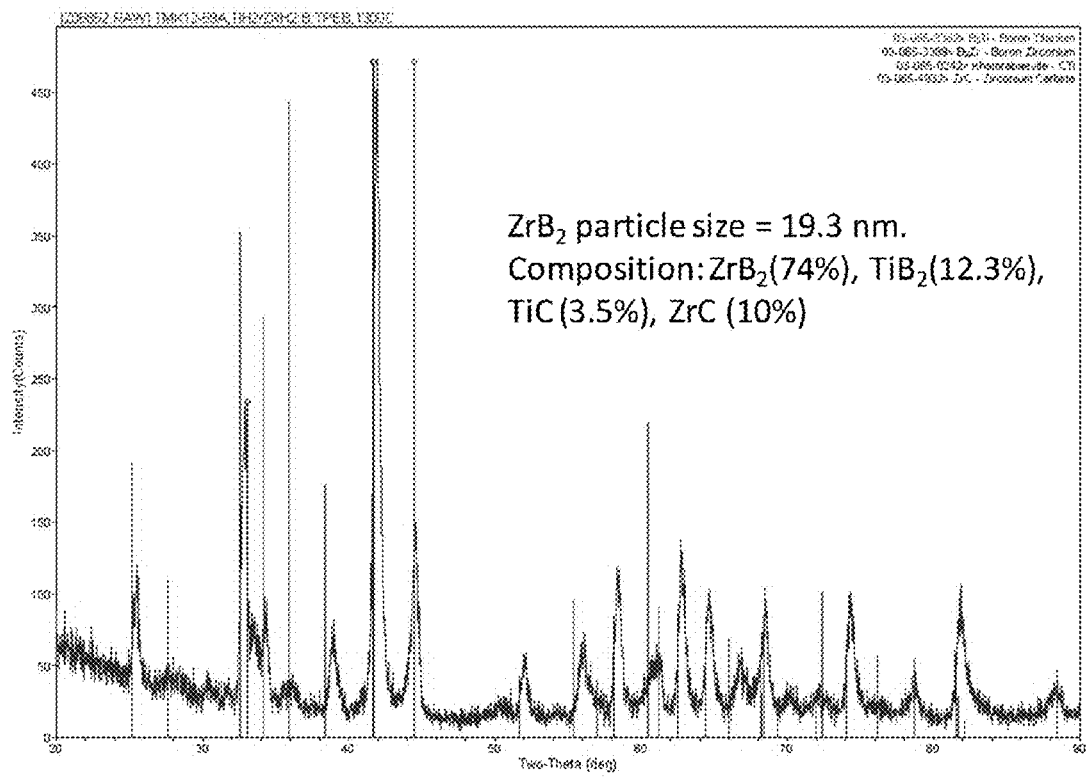
FIG. 14 shows an XRD of a sample containing $TiB_2$, TiC, $ZrB_2$, and ZrC nanoparticles.

Formation of nanoparticle refractory $TiB_2$ and $ZrB_2$ solid ceramic composition in one step by heating to 1300° C.—Equal amounts (55 mg) of $TiH_2$/boron/TPEB and $ZrH_2$/boron/TPEB prepared as in Examples 1 and 9 were thoroughly mixed. A sample (83.9220 mg) of this mixture was weighed into a ceramic pan, packed with a flat surface, flushed with a flow (110 cc/min) of argon for 15 min, and then heated in a TGA chamber at 10° C./min to and at 250° C. for 1 hr. The solid thermoset polymer was then heated at 2° C./min to and at 1300° C. for 3 hr resulting in weight retention of 97.24% of a shaped solid ceramic solid. The carbon ceramic solid was removed and found to exhibit structural integrity. XRD analysis (FIG. 14) showed a very complex mixture of ceramic nanoparticle materials being formed including $ZrB_2$ (74%, particle size of 19.3 nm), $TiB_2$ (12.3%), TiC (~3.5%), and ZrC (~10%), all of which were embedded in a carbon matrix. The percentages shown are the crystalline materials in the sample. The XRD was so complex that it was not possible to determine the nanoparticle sizes for some of the ceramics.

Example 20

Figure 15:
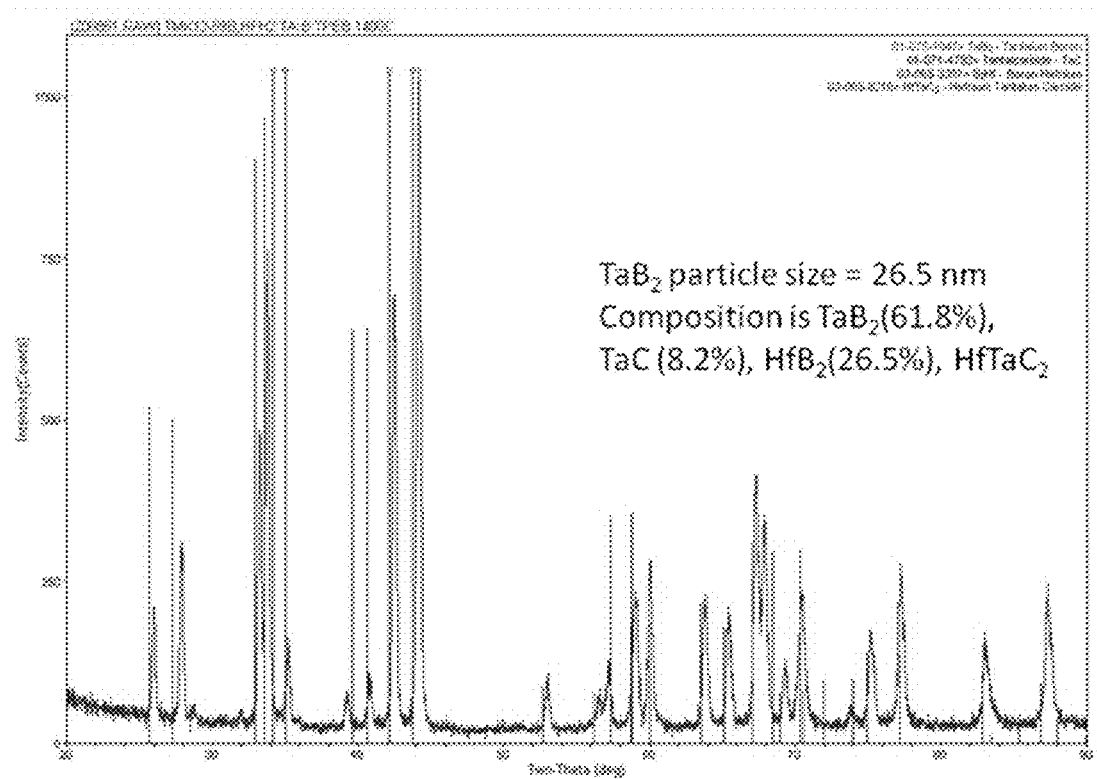
FIG. 15 shows an XRD of a sample containing $TaB_2$, TaC, $HfB_2$, and HfC nanoparticles.

Formation of nanoparticle refractory $HfB_2$ and $TaB_2$ solid ceramic composition in one step by heating to 1400° C.—Equal amounts (77 mg) of $HfH_2$/boron/TPEB and Ta powder/boron/TPEB prepared as in Examples 11 and 17 were thoroughly mixed. A sample (143.3430 mg) of this mixture was weighed into a ceramic pan, packed with a flat surface, flushed with a flow (110 cc/min) of argon for 15 min, and then heated in a TGA chamber at 10° C./min to and at 250° C. for 1 hr. The solid thermoset polymer was then heated at 2° C./min to and at 1300° C. for 3 hr followed by heating at 1° C./min to and at 1400° C. for 1 hr resulting in weight retention of 98.36% of a shaped ceramic solid. The carbon ceramic solid was removed and found to exhibit structural integrity. XRD analysis (FIG. 15) showed a complex mixture of ceramic nanoparticle materials being formed including $TaB_2$ (61.8%, particle size of 26.5 nm), $HfB_2$ (26.5%), TiC (8.2%), and HaTaC (2.4%). The percentages shown are the crystalline materials in the sample. The XRD was so complex that it was not possible to determine the nanoparticle sizes for some of the ceramics.

Example 21

Formulation of precursor composition of $TiH_2$, boron, and DEBP (1:2.1:0.03)—DEBP (0.108 g; 0.534 mmol), boron (0.455 g, 42.1 mmol), and $TiH_2$ (1.00 g; 20.0 mmol) were thoroughly mixed and used as the precursor composition for the formation of refractory nanoparticle titanium boride ($TiB_2$) embedded or bonded with the excess of carbon that behaves as a matrix material. The ratio of the three reactants can be readily varied by the described formulation method.

Example 22

Formation of nanoparticle $TiB_2$ solid ceramic composition from $TiH_2$, boron, and DEBP as the carbon source in one step by heating to 1300° C.—A sample (68.1378 mg) of the powdered composition prepared as in Example 21 was weighed into a ceramic pan, packed with a flat surface, flushed with argon for 15 min, and then heated in a TGA chamber under a flow (110 cc/min) of argon at 40° C./min to and at 250° C. for 1 hr to consolidate to a shaped solid thermoset polymer. The resulting thermoset polymer contained a homogeneous distribution of titanium hydride ($TiH_2$) and elemental boron embedded in the domain of the polymer. The solid thermoset polymer sample was slowly heated at 2° C./min to and at 1300° C. for 3 hr affording weight retention of 93.89% of a carbon ceramic solid. The refractory metal ceramic carbon matrix composition was formed in one step and retained its structural integrity.

Example 23

Formulation of $TiH_2$, boron, and TPEB carbon fiber polymeric composite—Into a 0.5 in diameter mold formed from aluminum foil was placed the precursor composition (1.8567 g of the $TiH_2$, boron, and TPEB mixture) prepared as in Example 1 and a small amount of chopped carbon fibers was added and mixed. The mixture was heated to 240° C. to melt the TPEB and the melted composition was pressed with a flat surface to consolidate to a flat surface. The resulting carbon fiber-precursor composition was then heated under a flow of argon at 260-270° C. for 1 hr resulting in solidification to a shaped carbon fiber-containing polymeric thermoset in which the $TiH_2$ and boron were embedded within the fiber-reinforced polymer thermoset composite. The shaped solid carbon fiber polymeric composite was removed from the mold.

Example 24

Conversion of the $TiH_2$ and boron carbon fiber polymeric composite to $TiB_2$ carbon fiber ceramic composite—The solid shaped carbon fiber polymeric composite prepared in Example 23 with a homogeneous distribution of the $TiH_2$ and boron within the thermoset polymeric fiber reinforced composite was placed in an oven and heated under a flow of argon at 3° C./min to 1200° C. and held at the temperature for 2 hr. The resulting ceramic-carbon reinforced composite was cooled at 3° C./min back to room temperature. The solid fiber reinforced composite sample was characterized by XRD and found to contain refractory $TiB_2$ nanoparticles and a small amount of TiC nanoparticles embedded in the carbon matrix and carbon fibers.

Example 25

Formation of $ZrH_2$, boron, and TPEB carbon fiber polymeric composite—Into a 0.5 in diameter mold fabricated from aluminum foil was placed a precursor composition (2.145 g of the $ZrH_2$, boron, and TPEB mixture) prepared as in Example 7 and a small amount of chopped carbon fibers was added and mixed. The mixture was heated to 240° C. to melt the TPEB and the melted composition was pressed with a flat surface to consolidate to a flat surface. The resulting carbon fiber-precursor composition was heated under a flow of argon at 260-270° C. for 1 hr resulting in solidification to a shaped carbon fiber-containing polymeric thermoset. The solid shaped carbon fiber polymeric composite with a homogeneous distribution of the $ZrH_2$ and boron was removed from the mold.

Example 26

Conversion of the $ZrH_2$ and boron carbon fiber polymeric composite to $ZrB_2$ carbon fiber ceramic composite—The solid shaped carbon fiber polymeric composite prepared in Example 25 was placed in an oven and heated under a flow of argon at 3° C./min to 1200° C. and held at the temperature for 3 hr. The resulting ceramic-carbon fiber reinforced composite was cooled at 3° C./min back to room temperature.

Example 27

Formation of $HfH_2$, boron, and TPEB carbon fiber polymeric composite—Into a 0.5 in diameter mold fabricated from aluminum foil was placed a precursor composition (2.8558 g of $HfH_2$, boron, and TPEB mixture) prepared as in Example 11 and a small amount of chopped carbon fibers was added and mixed. The composition was heated to 240° C. to melt the TPEB and the melted composition was pressed with a flat surface to consolidate to a flat surface. The resulting carbon fiber-precursor composition was heated under a flow of argon at 260-270° C. for 1 hr resulting in solidification to a shaped carbon fiber-containing polymeric thermoset. The solid shaped carbon fiber polymeric composite with a homogeneous distribution of the $HfH_2$ and boron was removed from the mold.

Example 28

Conversion of the $HfH_2$ and boron carbon fiber polymeric composite to $HfB_2$ carbon fiber ceramic composite—The solid shaped carbon fiber polymeric composite prepared in Example 27 was placed in an oven and heated under a flow of argon at 3° C./min to 1200° C. and held at the temperature for 4 hr. The resulting ceramic-carbon fiber reinforced composite was cooled at 3° C./min back to room temperature.

Example 29

Formulation of prepolymer composition of TPEB—TPEB (10.30 g; 21.5 mmol) was placed in an aluminum planchet and heated at 260° C. for 40 minutes or until the mixture was viscous to stir with a metal spatula. The mixture was cooled, broken into small pieces, and ball milled for 2 minutes resulting in a fine black powder.

Example 30

Formulation of precursor composition of $TiH_2$, boron, TPEB prepolymer and formation of shaped pellet—TPEB prepolymer (0.129 g; 0.270 mmol) from Example 29, boron (0.455 g, 42.1 mmol), and $TiH_2$ (1.00 g; 42.1 mmol) were ball milled for 5 minutes resulting in a deep red-black fine powder. The powder was placed in a 13 mm pellet press and pressed at 10,000 pounds for 1 minute.

Example 31

Conversion of precursor composition of $TiH_2$, boron, and TPEB prepolymer to solid shaped thermoset—The pellet from Example 30 was placed in a furnace, heated at 20°

C./min under an argon atmosphere to 200° C., and held at this temperature for 10 hr (overnight) resulting in the formation of a tough shaped polymeric thermoset solid. The $TiH_2$ and boron were homogeneous dispersed in the solid thermoset.

Example 32

Conversion of precursor composition of $TiH_2$, boron, and TPEB prepolymer to solid shaped thermoset—Another pellet prepared as in Example 30 was placed in a furnace, heated at 20° C./min under an argon atmosphere to 250° C., and held at this temperature for 2 hr resulting in the formation of a tough shaped polymeric thermoset solid.

Example 33

Formation of refractory $TiB_2$ solid ceramic in one step by heating at 10° C./min to 1400° C. under an argon atmosphere—The shaped polymeric thermoset solid (1.55 g) from Example 31 was placed in a 3" tube furnace, heated at 2° C./min under a flow (100 cc/min) of argon to 1400° C., and held at 1400° C. for 2 hr yielding a solid dense ceramic with weight retention of 97.8%. The solid ceramic was removed from the furnace, characterized XRD, and found to form nanoparticle sized $TiB_2$ along with a small amount of TiC in an excess of carbon as the matrix. The $TiB_2$—TiC carbon solid composition was formed in one step and exhibited great structural integrity, hardness, and toughness.

Example 34

Formulation of precursor composition of $TiH_2$, boron, and TPEB prepolymer, formation of shaped pellet, and direct conversion to refractory TiC solid ceramic carbon composition in one step—TPEB prepolymer (0.129 g; 0.270 mmol) prepared in Example 29, boron (0.455 g, 42.1 mmol), and $TiH_2$ (1.00 g; 42.1 mmol) were ball milled for 5 minutes resulting in a deep red-black fine powder. The powder was placed in a 13 mm pellet press and pressed to 10,000 pounds for 1 minute. The pellet was then placed in a furnace, heated at 20° C./min under an argon atmosphere to 250° C., and held at this temperature for 30 minutes followed by heating at 2° C./min under a flow (100 cc/min) of argon to 1200° C. and holding at 1200° C. for 3 hr yielding a solid dense ceramic with weight retention of 97.1%. Upon cooling, the solid ceramic was removed from the furnace, characterized by XRD, and found to form nanoparticle sized $TiB_2$ along with a small amount of TiC in an excess of carbon as the matrix. The $TiB_2$—TiC carbon solid composition was formed in one step and exhibited great structural integrity, hardness, and toughness.

Example 35

Formulation of precursor composition of tungsten powder, boron, and TPEB prepolymer and pellet formation—TPEB prepolymer (0.018 g; 0.038 mmol) from Example 29, boron (0.035 g, 3.24 mmol), and tungsten powder (0.500 g; 2.72 mmol) were ball milled for 5 minutes resulting in a deep red-black fine powder. The powder was placed in a 13 mm pellet press and pressed at 10,000 pounds for 10 sec.

Example 36

Conversion of precursor composition of tungsten powder, boron, and TPEB prepolymer to solid shaped thermoset—The pellet from Example 35 was placed in a furnace, heated at 20° C./min under an argon atmosphere to 215° C., and held at this temperature for 10 hr (overnight) resulting in the formation of a tough shaped polymeric solid. The tungsten and boron powders were homogeneous dispersed in the solid thermoset.

Example 37

Formation of refractory WB solid ceramic in one step by heating at 2° C./min to 1500° C. under an argon atmosphere—The cured thermoset pellet (0.525 g) from Example 36 was placed in a 3" tube furnace, heated at 2° C./min under a flow (100 cc/min) of argon to 1500° C., and held at 1500° C. for 2 hr yielding a solid dense ceramic with weight retention of 99.5%. Upon cooling, the solid ceramic was removed from the furnace, characterized by XRD, and found to form nanoparticle sized pure WB and a small amount of nanoparticle sized WC in an excess of carbon as the matrix. All of the tungsten had reacted. The WB-WC carbon solid composition was formed in one step and exhibited structural integrity, hardness, and toughness.

Example 38

Formulation of precursor composition of $HfH_2$, boron, and TPEB prepolymer—TPEB prepolymer (0.070 g; 0.146 mmol) from Example 29, boron (0.252 g, 23.3 mmol), and hafnium hydride (2.00 g; 11.1 mmol) were ball milled for 5 minutes resulting in a deep red-black fine powder. The powder was placed in a 13 mm pellet press and pressed at 10,000 pounds for 10 sec.

Example 39

Conversion of precursor composition of $HfH_2$, boron, and TPEB prepolymer to solid shaped thermoset—The pellet from Example 38 was placed in a furnace, heated at 20° C./min under an argon atmosphere to 210° C., and held at this temperature for 10 hr (overnight) resulting in the formation of a tough shaped polymeric solid. The hafnium hydride and boron powders were homogeneous dispersed in the solid thermoset.

Example 40

Formation of refractory $HfB_2$ solid ceramic in one step by heating at 2° C./min to 1500° C. under an argon atmosphere—The cured thermoset pellet (2.29 g) from Example 39 was placed in a 3" tube furnace, heated at 2° C. min$^-$ under a flow (100 cc/min) of argon to 1500° C., and held at 1500° C. for 2 hr yielding a solid dense ceramic with weight retention of 99.4%. Upon cooling, the solid ceramic was removed from the furnace, characterized by XRD, and found to form nanoparticle sized predominately pure $HfB_2$ along with a small amount of nanoparticle sized HfC in an excess of carbon as the matrix. The $HfB_2$—HfC carbon solid composition was formed in one step and exhibited structural integrity, hardness, and toughness.

Example 41

Formulation of precursor composition of $ZrH_2$, boron, and TPEB prepolymer—TPEB prepolymer (0.050 g; 0.105 mmol) from Example 29, boron (0.116 g, 10.7 mmol), and zirconium hydride (0.500 g; 5.36 mmol) were ball milled for 5 minutes resulting in a deep red-black fine powder. The powder was placed in a 13 mm pellet press and pressed at 8,000 pounds for 10 sec.

Example 42

Conversion of precursor composition of $ZrH_2$, boron, and TPEB prepolymer to solid shaped thermoset—The pellet from Example 41 was placed in a furnace, heated at 20° C./min under an argon atmosphere to 210° C., and held at this temperature for 10 hr (overnight) resulting in the formation of a tough shaped polymeric solid. The zirconium hydride and boron powders were homogeneous dispersed in the solid thermoset.

Example 43

Formation of refractory $ZrB_2$ solid ceramic in one step by heating at 2° C./min to 1400° C. under an argon atmosphere—The cured thermoset pellet (0.625 g) from Example 42 was placed in a 3" tube furnace, heated at 2° C./min under a flow (100 cc/min) of argon to 1400° C., and held at 1400° C. for 2 hr yielding a solid dense ceramic with weight retention of 98.5%. Upon cooling, the solid ceramic was removed from the furnace, characterized by XRD, and found to form nanoparticle sized pure $ZrB_2$ and a smaller amount of nanoparticle sized ZrC in an excess of carbon as the matrix. The $ZrB_2$—ZrC carbon solid composition was formed in one step and exhibited structural integrity, hardness, and toughness.

Example 44

Formulation of precursor composition of $TiH_2$, boron, and TPEB prepolymer containing chopped fibers—TPEB prepolymer (1.29 g; 2.70 mmol) from Example 29, boron (4.55 g, 42.1 mmol), and $TiH_2$ (10.00 g; 200 mmol) were ball milled for 5 minutes resulting in a deep red-black fine powder. Chopped fibers (1.00 g, ¼" length) were added and the solid mixture was placed in 100 mL of acetone and stirred for 6 hr. The solvent was removed and the solid mixture was placed in a 2½" pellet die and pressed at 10,000 pounds for 1 minute.

Example 45

Conversion of precursor composition of $TiH_2$, boron, and TPEB prepolymer containing chopped fibers to thermoset—The 2½" pellet from Example 44 was placed in a furnace, heated at 20° C./min under an argon atmosphere to 210° C., and held at this temperature for 10 hr (overnight) resulting in the formation of a tough shaped polymeric carbon fiber reinforced thermoset solid. The titanium hydride and boron powders were homogeneous dispersed in the solid thermoset-carbon fiber composite.

Example 46

Formation of refractory carbon fiber reinforced $TiB_2$ solid ceramic in one step by heating at 2° C./min to 1400° C. under an argon atmosphere—The carbon fiber-containing shaped polymeric thermoset pellet (15.7 g) from Example 45 was placed in a 3" tube furnace and heated at 2° C./min under a flow (100 cc/min) of argon to 1400° C. yielding a solid dense carbon fiber reinforced ceramic with weight retention of 97.2%. Upon cooling, the solid carbon fiber reinforced ceramic was removed from the furnace, characterized by XRD, and found to form nanoparticle sized $TiB_2$ and nanoparticle sized TiC in the carbon-carbon fiber composite. The $TiB_2$—TiC carbon-carbon fiber solid composition exhibited great structural integrity with the inclusion of the fiber reinforcement.

Example 47

Formulation of precursor composition of $ZrH_2$, boron, and TPEB prepolymer containing chopped fibers—TPEB prepolymer (1.00 g; 2.09 mmol) from Example 29, boron (2.32 g, 21.5 mmol), and $ZrH_2$ (10.00 g; 107 mmol) were ball milled for 5 minutes resulting in a deep red-black fine powder. Chopped fibers (0.50 g, ¼" length) were added and the solid mixture was placed in 100 mL of acetone and stirred for 4 hr. The solvent was removed and the solid mixture was placed in a 2½" pellet die and pressed at 10,000 pounds for 1 minute.

Example 48

Conversion of precursor composition of $TiH_2$, boron, and TPEB prepolymer containing chopped fibers to thermoset—The 2½" pellet from Example 47 was placed in a furnace, heated at 20° C./min under an argon atmosphere to 210° C., and held at this temperature for 10 hr (overnight) resulting in the formation of a tough shaped carbon fiber reinforced polymeric solid. The zirconium hydride and boron powders were homogeneous dispersed in the solid thermoset-carbon fiber composite.

Example 49

Formation of refractory $ZrB_2$ solid carbon fiber reinforced ceramic in one step by heating at 2° C./min to 1500° C. under an argon atmosphere—The carbon fiber-containing shaped polymeric thermoset pellet (12.5 g) from Example 48 was placed in a 3" tube furnace and heated at 2° C./min under a flow (100 cc/min) of argon to 1500° C. yielding a solid dense carbon fiber reinforced ceramic with weight retention of 97.5%. The solid carbon fiber reinforced ceramic was removed from the furnace, characterized by XRD, and found to form nanoparticle sized $ZrB_2$ and nanoparticle sized ZrC in the carbon-carbon fiber composite. The $ZrB_2$—ZrC carbon-carbon fiber solid composition exhibited great structural integrity with the inclusion of the fiber reinforcement.

Example 50

Formulation of precursor composition of $ZrH_2$ and boron—Zirconium hydride (0.500 g; 5.36 mmol) and boron (0.116 g, 10.7 mmol) were ball milled for 1 minute resulting in a gray fine powder. The powder was placed in a 6 mm pellet press and pressed to 4,000 pounds for 10 sec.

Example 51

Figure 16:
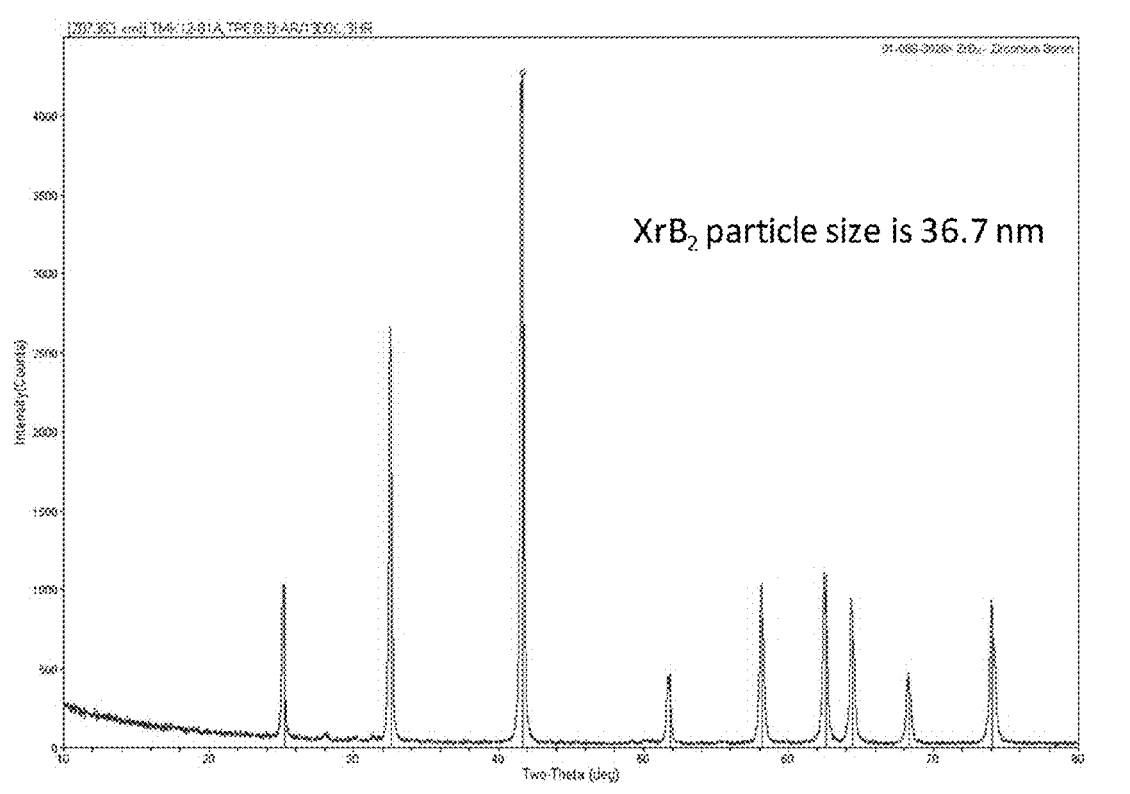
FIG. 16 shows an XRD of a sample containing only $ZrB_2$ nanoparticles.

Formation of pure nanoparticle refractory $ZrB_2$ ceramic solid in one step by controlled heating at 3° C./min to 1300° C. under an argon atmosphere—A $ZrH_2$-boron pellet (133.187 mg) prepared as in Example 50 was placed a TGA chamber and heated at 5° C./min to 250° C. followed by heating at 3° C./min to 1300° C. and holding at 1300° C. for 3 hr under a flow of argon at 100 cc/min affording solid ceramic material (pure $ZrB_2$) with a weight retention of 97.77%. Heating from 500° C. to 1300° C. resulted in the reaction of the highly reactive Zr nanoparticles, formed from decomposition of the $ZrH_2$, with the boron resulting in the formation of the nanoparticle $ZrB_2$. The novel refractory metal ceramic $ZrB_2$ was formed in one step. XRD (FIG. 16) of the ceramic pellet showed pure $ZrB_2$ with an average particle sizes of 36.7 nm. The ceramic pellet exhibited great structural integrity, hardness, and toughness.

Example 52

Formulation of precursor composition of $TiH_2$, boron, and TPEB prepolymer and
formation of shaped pellet-TPEB prepolymer form Example 29 (0.129 g; 0.270 mmol), boron (0.455 g, 42.1 mmol), and $TiH_2$ (1.00 g; 42.1 mmol) were ball milled for 1 minute resulting in a deep red-black fine powder. The powder was placed in a 6 mm pellet press and pressed to 4,000 pounds for 1 sec.

Example 53

Formation of nanoparticle refractory $TiB_2$, TiN, and TiC ceramic solid in one step by controlled heating to 1300° C. under an nitrogen atmosphere—The pellet (198.992 mg) prepared in Example 52 was placed in a TGA chamber and heated under a 100 cc/min flow of nitrogen at 5° C./min to 250° C. and held at 250° C. for 1 hr to consolidate to a shaped solid thermoset polymer. The isothermal heat treatment at 250° C. resulted in the reaction of the ethynyl units in the TPEB and conversion to the shaped thermoset polymer. The solid polymeric sample composed of $TiH_2$ and boron embedded in the polymeric thermoset was then slowly heated at 3° C./min to 1300° C. and held at 1300° C. for 3 hr affording a solid ceramic material, which had taken on about 12% wt relative to the initial weight. Above 400° C., degradation of the $TiH_2$ occurred to Ti nanoparticles and $H_2$; the $H_2$ vaporized from the sample. Further heating above 500° C. to 1300° C. resulted in the reaction of the highly reactive Ti nanoparticles with the boron, with nitrogen, and with the developing carbon atoms being formed from the carbonization of TPEB during the heat treatment. Upon cooling, the solid ceramic was removed from the furnace, characterized by XRD, and found to contain a large amount of TiN nanoparticles along with smaller portions of $TiB_2$ and TiC nanoparticles embedded in the excess carbon formed during the simple carbonization process. The $TiB_2$—TiN—TiC carbon solid composition was formed in one step and exhibited great structural integrity, hardness, and toughness.

Example 54

Formulation of precursor composition of $ZrH_2$, boron, and TPEB prepolymer—TPEB prepolymer (0.050 g; 0.105 mmol), boron (0.116 g, 10.7 mmol), and zirconium hydride (0.500 g; 5.36 mmol) were ball milled for 1 minute resulting in a deep red-black fine powder. The powder was placed in a 6 mm pellet press and pressed to 4,000 pounds for 10 sec.

Example 55

Figure 17:
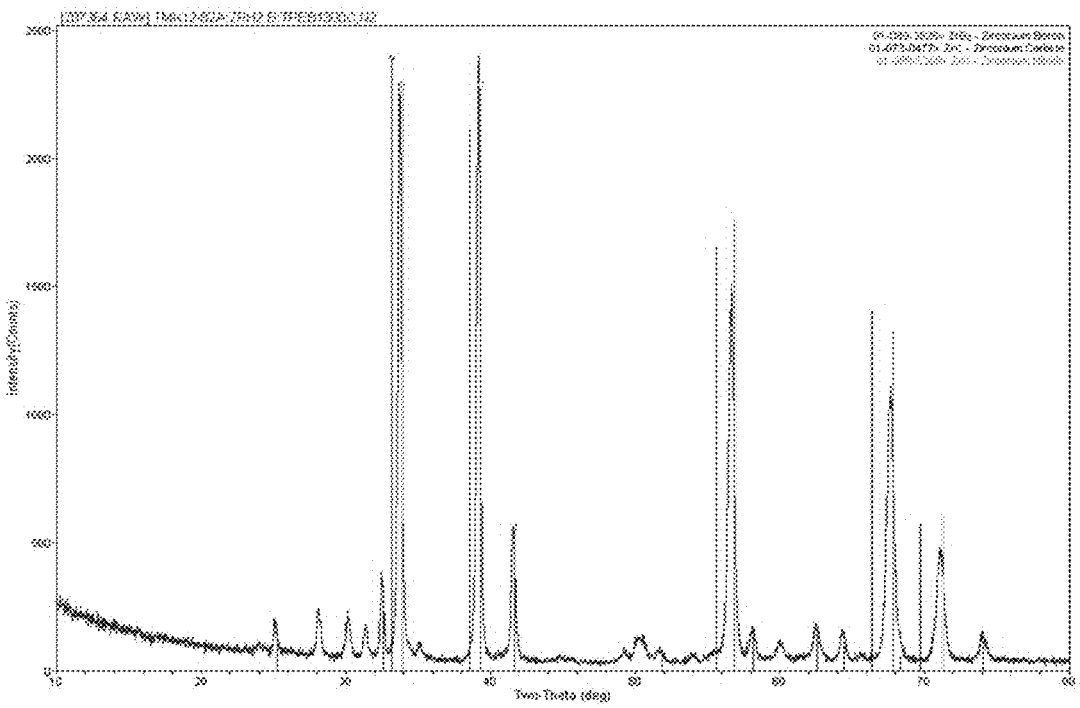
FIG. 17 shows an XRD of a sample containing $ZrB_2$, ZrC, and ZrN nanoparticles.

Formation of nanoparticle refractory $ZrB_2$, ZrN, and ZrC ceramic solid in one step by controlled heating to 1300° C. under an nitrogen atmosphere—The pellet precursor composition (200.819 mg) prepared in Example 54 was placed in a TGA chamber and heated at 5° C./min under a 100 cc/min flow of nitrogen to 250° C. and held at 250° C. for 1 hr, followed by heating at 3° C./min to 1300° C., and holding at 1300° C. for 3 hr yielding a solid dense ceramic which took on weight (final weight of sample was 220.755 mg) due to the reaction with nitrogen. Upon cooling, the solid ceramic was removed from the furnace, characterized by XRD (FIG. 17), and found to contain a large amount of ZrN along with smaller portions of $ZrB_2$ and ZrC nanoparticles embedded in the excess carbon formed during the simple carbonization process. The $ZrB_2$—ZrN—ZrC carbon solid composition was formed in one step and exhibited great structural integrity, hardness, and toughness.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A composition comprising:
   a metal component selected from:
      nanoparticles or particles of a refractory metal; and
      a refractory-metal compound capable of decomposing into refractory-metal particles;
   elemental boron; and
   an organic component selected from:
      an organic compound having a char yield of at least 60% by weight; and
      a thermoset made from the organic compound.

2. The composition of claim 1, wherein the refractory metal is titanium.

3. The composition of claim 1, wherein the refractory metal is a group IV-VI transition metal.

4. The composition of claim 1, wherein the metal component is a salt of the refractory metal, a hydride of the refractory metal, a carbonyl compound of the refractory metal, a halide of the refractory metal, or particles of the refractory metal.

5. The composition of claim 1, wherein the organic compound:
   contains only carbon and hydrogen;
   contains aromatic and acetylene groups;
   contains only carbon, hydrogen, and nitrogen or oxygen;
   contains no oxygen; or
   contains a heteroatom other than oxygen.

6. The composition of claim 1, wherein the organic compound is 1,2,4,5-tetrakis(phenylethynyl)benzene or a prepolymer thereof, 4,4'-diethynylbiphenyl, N, N'-(1,4-phenylenedimethylidyne)-bis-(3-ethynylaniline), dianilphthalonitrile, or resorcinol phthalonitrile or a prepolymer thereof.

7. The composition of claim 1, wherein the metal component and the organic component are the same compound.

8. The composition of claim 1, wherein the boron and the refractory-metal compound or particles of refractory metal are dispersed in the thermoset.

9. The composition of claim 1, wherein the composition comprises fibers.

10. The composition of claim 1, wherein the refractory metal is zirconium, hafnium, tungsten, niobium, molybdenum, chromium, tantalum, or vanadium.

11. The composition of claim 1, wherein the metal component is tungsten powder, tantalum powder, titanium hydride, zirconium hydride, or hafnium hydride.

12. The composition of claim 1, wherein the composition comprises carbon fibers, ceramic fibers, or metal fibers.

* * * * *